(12) United States Patent
Danziger

(10) Patent No.: US 12,730,308 B2
(45) Date of Patent: Sep. 8, 2026

(54) APERTURE MULTIPLIER WITH DEPOLARIZER

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 290 days.

(21) Appl. No.: 18/628,932

(22) Filed: Apr. 8, 2024

(65) Prior Publication Data

US 2024/0272430 A1 Aug. 15, 2024

Related U.S. Application Data

(63) Continuation of application No. 18/195,959, filed on May 11, 2023, now Pat. No. 11,953,682, which is a (Continued)

(51) Int. Cl.
*G02B 27/01* (2006.01)
*F21V 8/00* (2006.01)

(Continued)

(52) U.S. Cl.
CPC ........... *G02B 27/0101* (2013.01); *G02B 5/30* (2013.01); *G02B 6/0028* (2013.01); *G02B 6/0036* (2013.01); *G02B 6/10* (2013.01); *G02B 6/26* (2013.01); *G02B 27/0172* (2013.01); *G02F 1/295* (2013.01); *H04N 5/74* (2013.01);

(Continued)

(58) Field of Classification Search
CPC .... G02B 27/0101; G02B 5/30; G02B 6/0028; G02B 6/0036; G02B 6/10; G02B 6/26; G02B 27/0172; G02B 2027/0123; G02B 2027/0125; G02B 6/2786; G02B 27/0081; G02B 27/286; G02B 1/10; G02B 27/10;

(Continued)

(56) References Cited

U.S. PATENT DOCUMENTS 8,480,925 B2 7/2013 Fuchida et al.
9,164,290 B2 10/2015 Robbins et al.

(Continued)

FOREIGN PATENT DOCUMENTS

JP H1010522 1/1998

*Primary Examiner* — Collin X Beatty
(74) *Attorney, Agent, or Firm* — Rivka Friedman

(57) ABSTRACT

An optical aperture multiplier includes a first optical waveguide (10) having a rectangular cross-section and including partially reflecting surfaces (40) at an oblique angle to a direction of elongation of the waveguide. A second optical waveguide (20), also including partially reflecting surfaces (45) at an oblique angle, is optically coupled with the first optical waveguide (10). An image coupled into the first optical waveguide with an initial direction of propagation at an oblique coupling angle advances by four-fold internal reflection along the first optical waveguide, with a proportion of intensity of the image reflected at the partially reflecting surfaces so as to be coupled into the second optical waveguide, and then propagates through two-fold reflection within the second optical waveguide, with a proportion of intensity of the image reflected at the partially reflecting surfaces so as to be directed outwards from one of the parallel faces as a visible image.

16 Claims, 23 Drawing Sheets

Related U.S. Application Data continuation of application No. 17/857,081, filed on Jul. 4, 2022, now Pat. No. 11,686,939, which is a continuation of application No. 16/792,338, filed on Feb. 17, 2020, now Pat. No. 11,567,316, which is a continuation of application No. 16/172,897, filed on Oct. 29, 2018, now Pat. No. 10,564,417, which is a continuation of application No. 15/749,511, filed as application No. PCT/IL2017/051028 on Sep. 12, 2017, now Pat. No. 10,133,070.

(60) Provisional application No. 62/509,369, filed on May 22, 2017, provisional application No. 62/418,919, filed on Nov. 8, 2016, provisional application No. 62/405,936, filed on Oct. 9, 2016.

(51) Int. Cl.
*G02B 5/30* (2006.01)
*G02B 6/10* (2006.01)
*G02B 6/26* (2006.01)
*G02F 1/295* (2006.01)
*H04N 5/74* (2006.01)

(52) U.S. Cl.
CPC ................ *G02B 2027/0123* (2013.01); *G02B 2027/0125* (2013.01)

(58) Field of Classification Search
CPC ....... G02B 27/285; G02B 27/14; G02F 1/295; H04N 5/74
See application file for complete search history.

(56) References Cited

U.S. PATENT DOCUMENTS

2010/0067110 A1* 3/2010 Hadad .................... G02B 5/04 359/485.06
2013/0058364 A1 3/2013 Huber et al.

* cited by examiner

FIG. 1A FIG. 1B
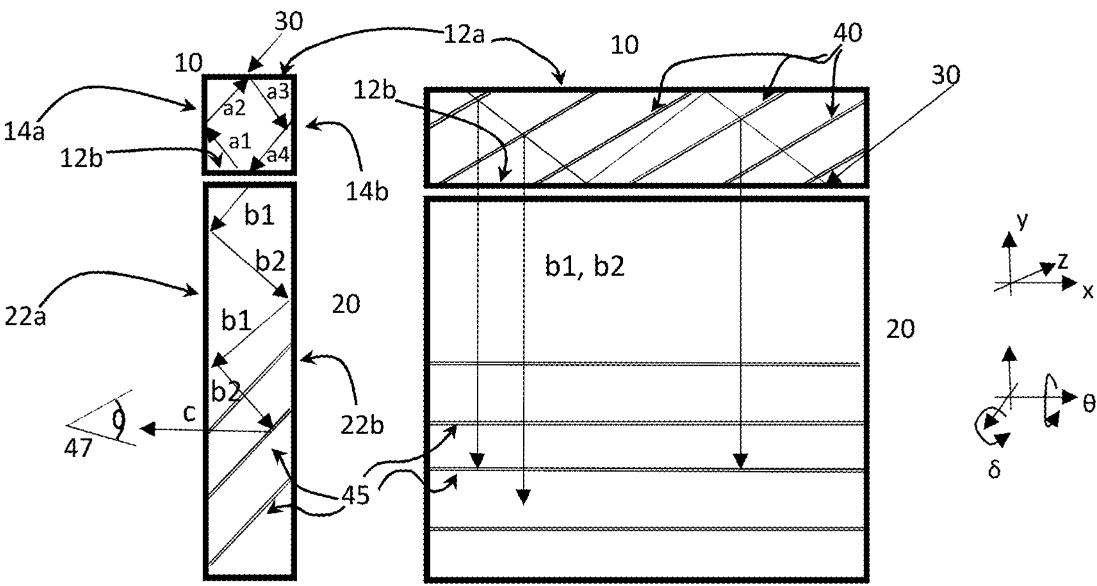
FIG. 2A FIG. 2B
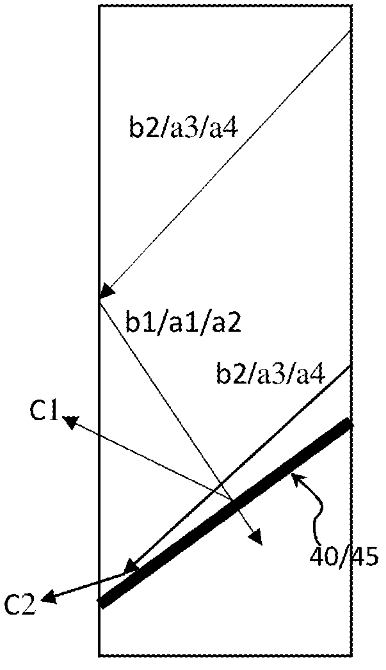
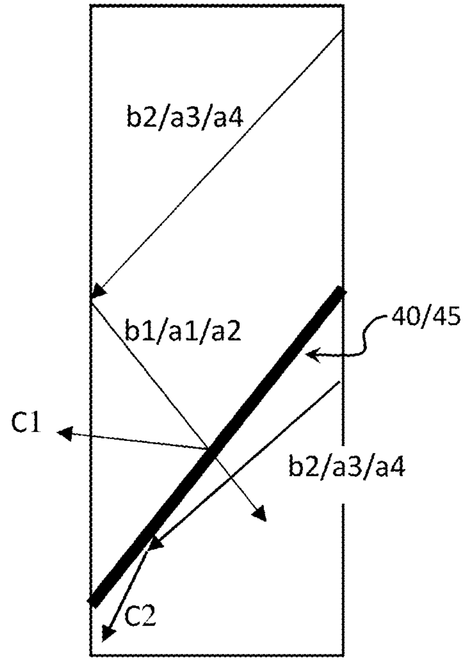

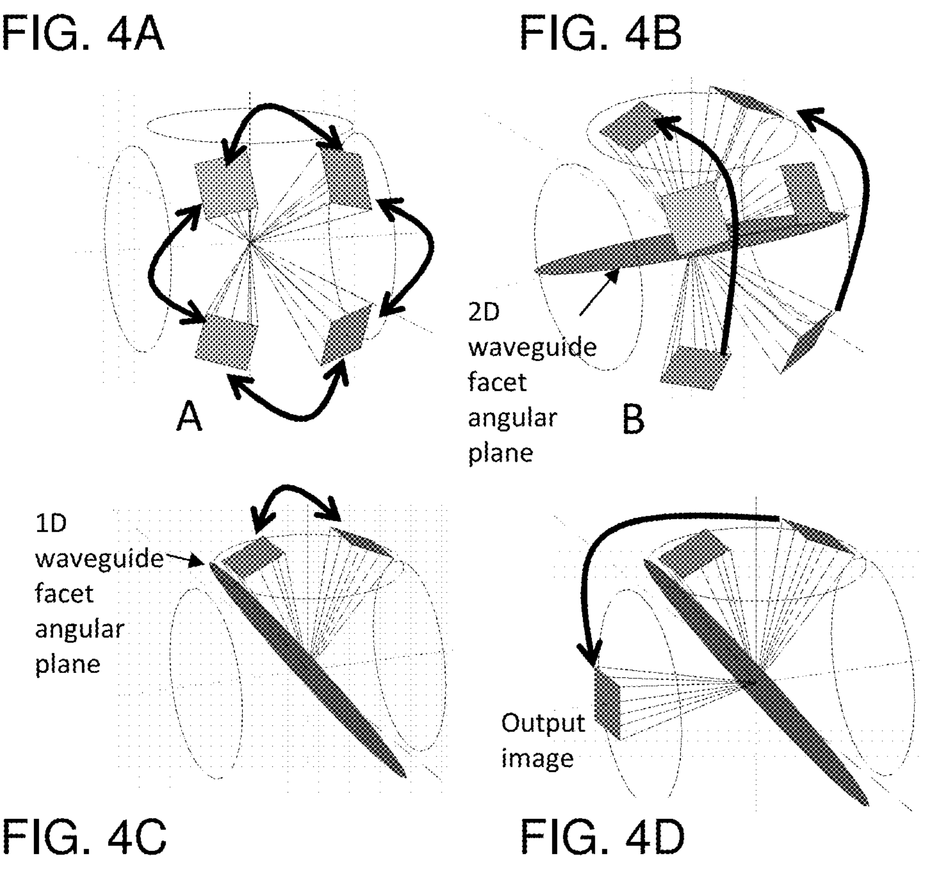
FIG. 4A
FIG. 4B
A
2D
waveguide
facet
angular
plane
B
1D
waveguide
facet
angular
plane
Output
image
FIG. 4C
FIG. 4D
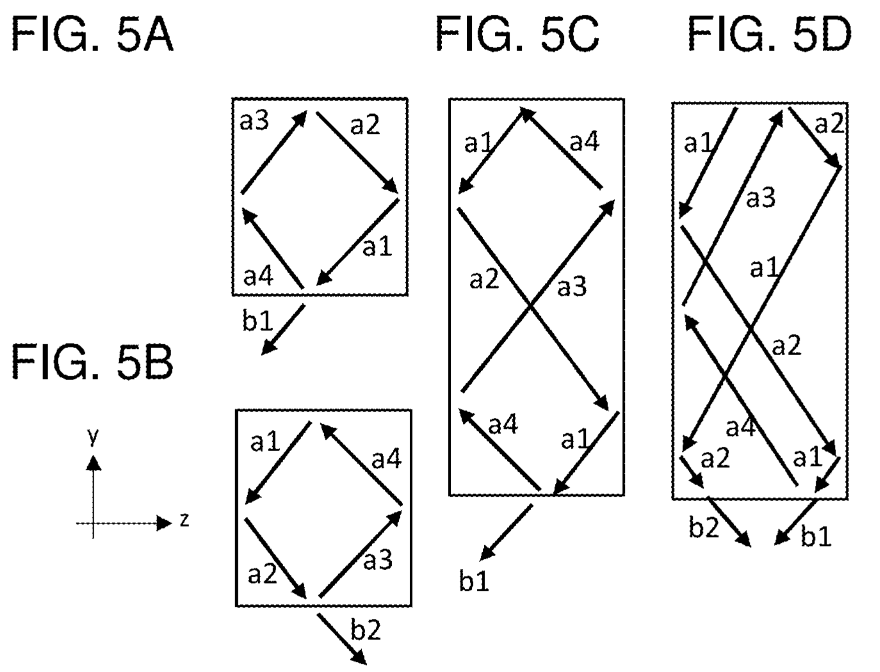
FIG. 5A
FIG. 5C
FIG. 5D
a3
a2
a4
a1
b1
FIG. 5B
y
z
a1
a4
a2
a3
b2
a1
a4
a2
a3
a4
a1
b1
a1
a2
a3
a1
a2
a4
a2
a1
b2
b1

18b
91
16b
16a
18a
14a
12a
14a
12a
16b
18a
14b 16a
91
18b 18b
91
16b
16a
18a
14a
10
12a
14a
10
12a
16b
18a
14b 16a
91
18b

FIG. 10A
top
16b
10
91
30
16a
front
(front)
FIG. 10B
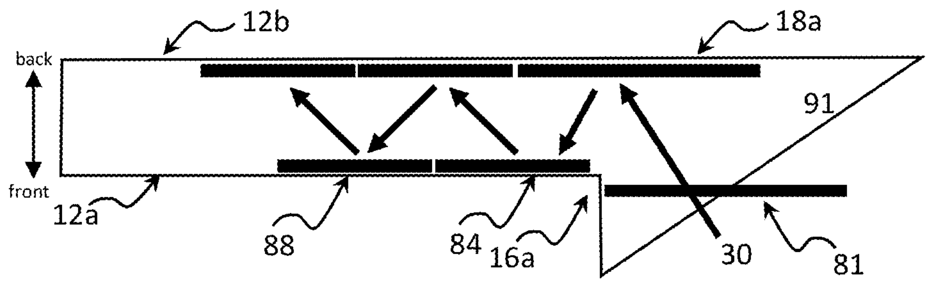
FIG. 10C
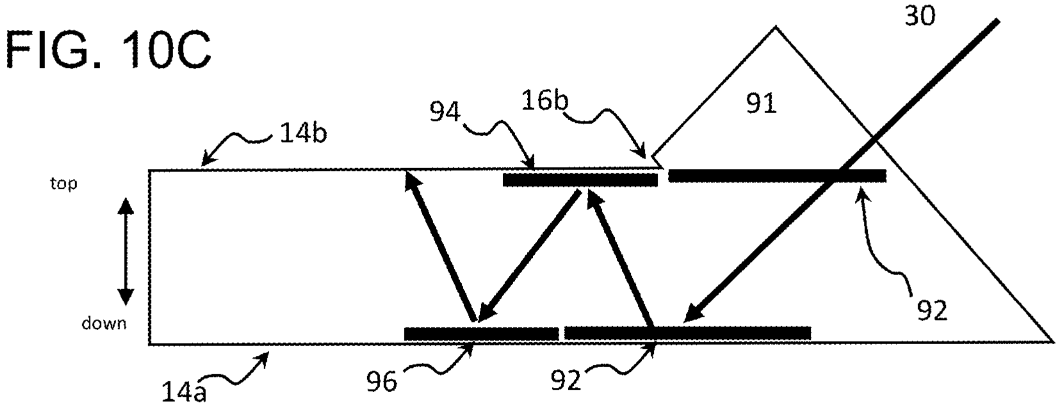

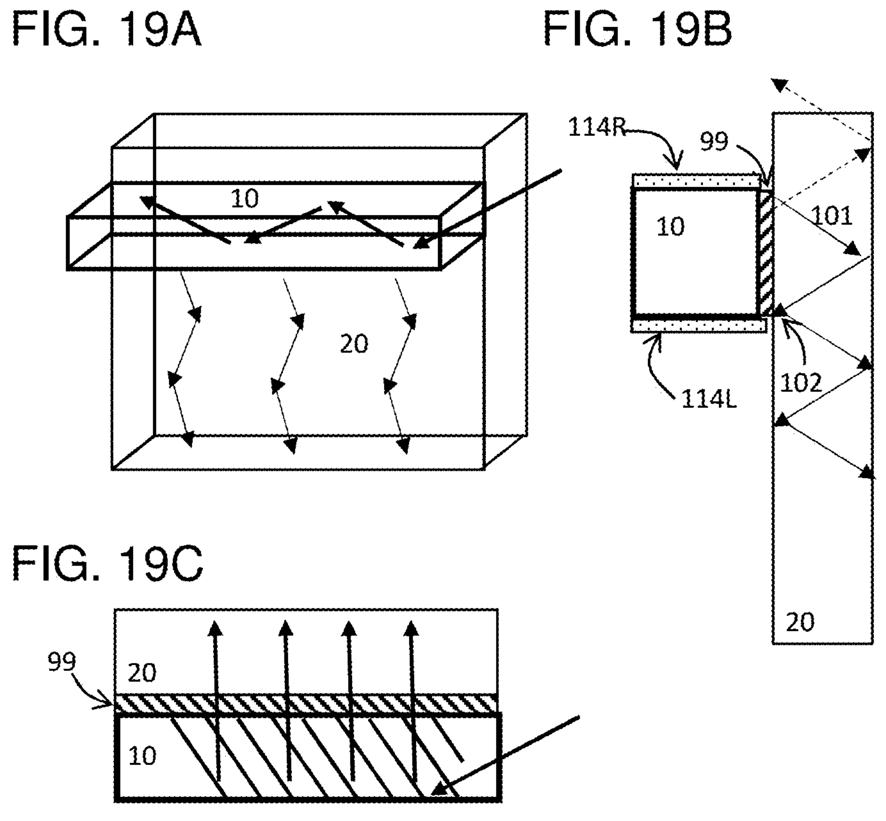
FIG. 19A
10
20
FIG. 19B
114R
99
10
101
102
114L
20
FIG. 19C
99
20
10
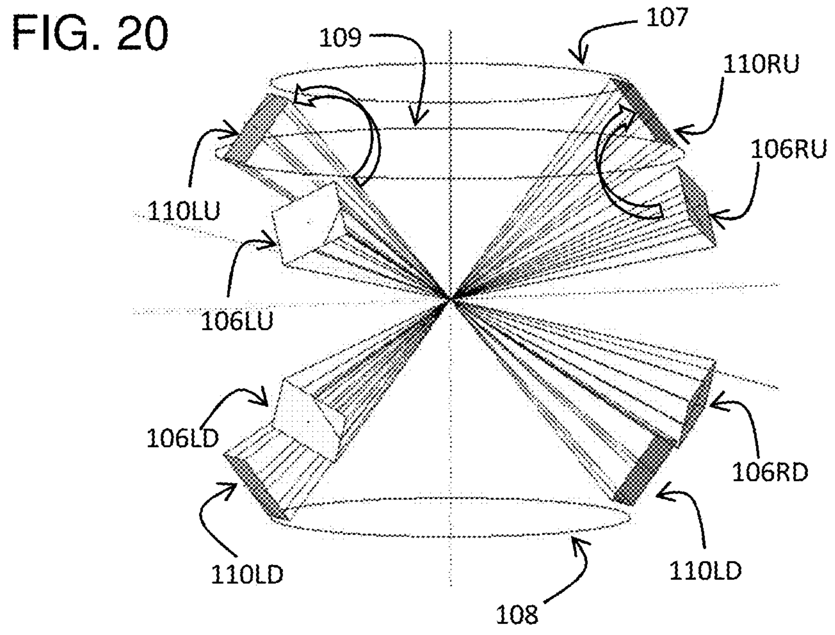
FIG. 20
109
107
110RU
106RU
110LU
106LU
106LD
106RD
110LD
110LD
108

APERTURE MULTIPLIER WITH DEPOLARIZER

FIELD AND BACKGROUND OF THE INVENTION

The present invention relates to optical aperture multipliers and, in particular, it concerns an optical aperture multiplier that includes a rectangular waveguide, and near-eye displays and head-up displays which employ such aperture multipliers.

Optical arrangements for near eye display or head up display require large aperture to cover the area where the observer's eye is located (the eye motion box). In order to implement a compact device, the image is generated by small optical image generator having small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred to herein as a one-dimensional waveguide in that it contains the image wavefront by internal reflection in one dimension. In the plane of the slab (i.e., of the slab surfaces), the image must be collimated so as to maintain image quality across the waveguide.

The slab-propagation approach is quite suitable for a second stage of aperture multiplication, where the slab is deployed opposite the eye of the observer (like a glasses lens for near-eye displays, or a window for larger head-up displays) and forms the final output surface from which the image reaches the eye. This approach is however non-optimal for a first stage of multiplication, where the requirements for width of the slab compared to the width of the image wavefront add bulk and weight to the device.

SUMMARY OF THE INVENTION

The present invention is an optical arrangement.

According to the teachings of an embodiment of the present invention there is provided, an optical arrangement comprising: (a) an image projector configured to project image illumination corresponding to a collimated image via an output surface, the image projector comprising at least one polarizing element such that the image illumination is polarized; (b) an optical aperture expansion arrangement comprising at least one waveguide having at least one pair of parallel external faces, the image illumination propagating within the at least one waveguide by internal reflection at the at least one pair of external faces, the optical aperture expansion arrangement including a coupling-out arrangement for progressively redirecting a proportion of the image illumination outwards from the optical aperture expansion arrangement towards a viewer; and (c) a depolarizer deployed in a path of the image illumination after the at least one polarizing element of the image projector and before the at least one waveguide.

According to a further feature of an embodiment of the present invention, the depolarizer is a passive depolarizer.

According to a further feature of an embodiment of the present invention, the depolarizer comprises at least one layer of birefringent material deployed in a path of the image illumination.

According to a further feature of an embodiment of the present invention, the depolarizer is a depolarizer selected from the group consisting of: a Cornu depolarizer; a Lyot depolarizer; and a wedge depolarizer.

According to a further feature of an embodiment of the present invention, the depolarizer is an active depolarizer.

According to a further feature of an embodiment of the present invention, the depolarizer includes at least one liquid crystal element switchable between at least two polarization-rotating states.

According to a further feature of an embodiment of the present invention, the image projector projects a video image with a frame rate, and wherein the depolarizer alters a state of the at least one liquid crystal element at a cycle rate that is greater than the frame rate.

According to a further feature of an embodiment of the present invention, the coupling-out arrangement comprises a plurality of mutually-parallel partially-reflective surfaces within the at least one waveguide, the plurality of partially-reflective surfaces being deployed within the substrate and angled at an oblique angle to the at least one pair of external faces.

According to a further feature of an embodiment of the present invention, the coupling-out arrangement comprises at least one diffractive optical element associated with the at least one waveguide.

According to a further feature of an embodiment of the present invention, the optical aperture expansion arrangement comprises two waveguide portions, wherein the coupling-out arrangement is associated with a second of the two waveguide portions, and wherein a first of the two waveguide portions includes an image redirecting arrangement configured to redirect the image illumination from a first direction of propagation within the first waveguide portion to a second direction of propagation within the second waveguide portion.

According to a further feature of an embodiment of the present invention, the first waveguide portion has two pairs of parallel external faces.

According to a further feature of an embodiment of the present invention, the at least one polarizing element of the image projector comprises at least one polarizing beam splitter.

BRIEF DESCRIPTION OF THE DRAWINGS

The invention is herein described, by way of example only, with reference to the accompanying drawings, wherein:

FIGS. 1A and 1B are schematic side and front representations, respectively, of an optical aperture multiplier, constructed and operative according to the teachings of an embodiment of the present invention;

FIGS. 2A and 2B are schematic diagrams illustrating two possible geometries of image rays propagating relative to partially reflecting internal facets in waveguides from the optical aperture multiplier of FIGS. 1A and 1B;

FIGS. 4A-4D are schematic isometric representations showing the interrelationship between various conjugate images and their reflections in internal facets for the optical aperture multiplier of FIGS. 1A and 1B;

FIGS. 5A-5D are schematic representations of the relationships between various rays in conjugate images propagating along a 2D waveguide from the optical aperture multiplier of FIGS. 1A and 1B, for various initial ray directions and various geometrical forms of waveguide;

FIGS. 10A-10C are an isometric view, top view and side view, respectively, of an alternative implementation of a coupling prism and 2D waveguide;

FIGS. 19A-19C are schematic isometric, side and top views, respectively, illustrating a variant coupling geometry between a 2D waveguide and a 1D waveguide according to a further implementation of the present invention;

FIG. 20 is a schematic isometric representation showing the interrelationship between various conjugate images and their reflections in internal facets for the optical aperture multiplier of FIGS. 19A-19C;

FIGS. 35A and 35B are schematic front and side views, respectively, illustrating the potential impact of an embodiment of the present invention on intensity of a transmitted view of a directly viewed scene; and FIGS. 35C and 35D are views similar to FIGS. 35A and 35B illustrating a transmitted view intensity correction according to a further aspect of the present invention.

DESCRIPTION OF THE PREFERRED EMBODIMENTS

Figure 3:
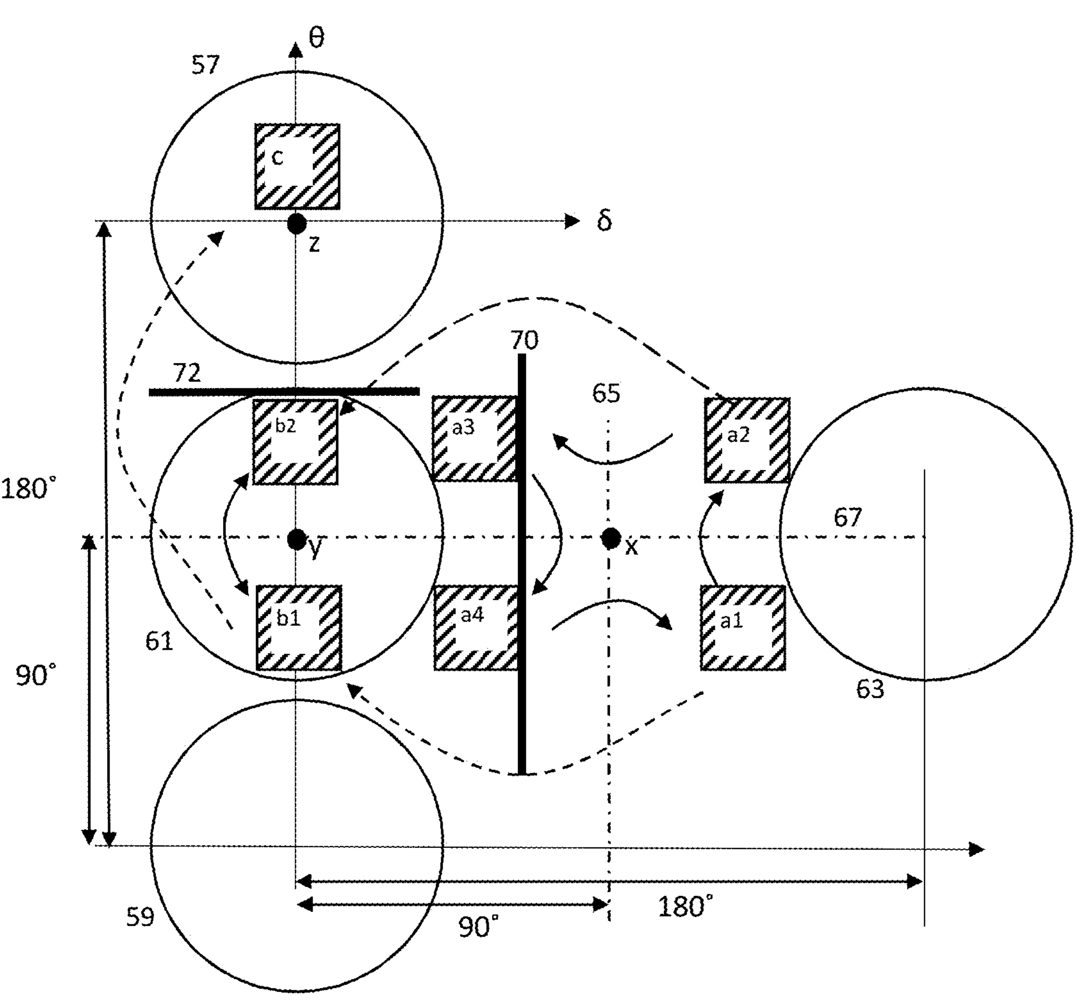
FIG. 3 is a schematic two-dimensional projection of angular relationships between the various reflected images and internal facets of the optical aperture multiplier of FIGS. 1A and 1B.

The present invention is an optical aperture multiplier that includes a rectangular waveguide.

The principles and operation of optical aperture multipliers according to the present invention may be better understood with reference to the drawings and the accompanying description.

Referring now to the drawings, FIGS. 1A-35 illustrate various aspects of an optical aperture multiplier, constructed and operative according to certain embodiments of the present invention. In general terms, an optical aperture multiplier according to an embodiment of the present invention includes a first optical waveguide 10 having a direction of elongation illustrated arbitrarily herein as corresponding to the "x-axis". First optical waveguide 10 has first and second pairs of parallel faces 12*a*, 12*b*, 14*a*, 14*b* forming a rectangular cross-section. According to certain particularly preferred embodiments of the present invention, a plurality of internal partially reflecting surfaces 40, referred to herein as "facets", at least partially traverse first optical waveguide 10 at an oblique angle (i.e., neither parallel nor perpendicular) to the direction of elongation.

The optical aperture multiplier preferably also includes a second optical waveguide 20, optically coupled with first optical waveguide 10, having a third pair of parallel faces 22*a*, 22*b* forming a slab-type waveguide, i.e., where the other two dimensions of waveguide 20 are at least an order of magnitude greater than the distance between third pair of parallel faces 22*a*, 22*b*. Here too, a plurality of partially reflecting surfaces 45 preferably at least partially traverse second optical waveguide 20 at an oblique angle to the third pair of parallel faces.

The optical coupling between the waveguides, and the deployment and configuration of partially reflecting surfaces 40, 45 are such that, when an image is coupled into first optical waveguide 10 with an initial direction 30 of propagation at a coupling angle oblique to both the first and second pairs of parallel faces 12*a*, 12*b*, 14*a*, 14*b*, the image advances by four-fold internal reflection (images a1, a2, a3 and a4) along first optical waveguide 10, with a proportion of intensity of the image reflected at partially reflecting surfaces 40 so as to be coupled into second optical waveguide 20, and then propagates through two-fold reflection (images b1, b2) within second optical waveguide 20, with a proportion of intensity of the image reflected at partially reflecting surfaces 45 so as to be directed outwards from one of the parallel faces as a visible image c, seen by the eye of a user 47.

Turning now more specifically to FIGS. 1A and 1B, this shows a first illustration of an implementation of the above description. First waveguide 10 is referred to herein as a 2D waveguide in the sense that it guides the injected image in two dimensions by reflection between two sets of parallel faces, while second waveguide 20 is referred to as a 1D waveguide, guiding the injected image in only one dimension between one pair of parallel faces. Light beam 30 from an optical image generator (not depicted) is injected into first waveguide 10 at an angle. Consequently, the light propagates along waveguide 10 while being reflected from all four external faces of the waveguide as shown in the side view of FIG. 1A. In this process, four conjugate beam vectors are generated a1, a2, a3 and a4 which represent the same image as it is reflected internally by the faces.

The angle of beam 30 that is injected into waveguide 10 is set to reflect from all four external faces of this waveguide. The light beam should reflect from the bottom face 12*b* of first waveguide 10, i.e., the face adjacent to second waveguide 20, at shallow (grazing) angles and should transmit from 10 into 20 at steep angles. This property can be achieved by total internal reflection (TIR) or by optical coating. A diffractive pattern can also perform this optical property by combining diffraction with transmission on the same surface. Reflection from the other three faces 12*a*, 14*a* and 14*b* of first waveguide 10 can be generated the same way or by use of a reflecting coating.

Part of the guided light-beams (for example a1 and a2) within first waveguide 10 are reflected by the internal parallel partial reflectors (facets) 40 downward onto an input coupling surface of second waveguide 20. In second waveguide 20, these beams are defined as b1 and b2.

Beams b1 and b2 are reflected by the external faces and become conjugate, i.e., beam b1 is reflected to be b2 and vice versa (as depicted in FIG. 1A). The external front and back faces 14*a*, 14*b* of first waveguide 10 should be parallel to each other and, in this implementation, to the corresponding external faces 22*a*, 22*b* of second waveguide 20. Any deviation from parallelism will cause the coupled images b1 and b2 not to be precise conjugate images, and image quality will degrade.

The internal facets 45 within second waveguide 20 reflect beam b2 outside the waveguides and into the eye of the observer 47.

The reflection process by the internal facets in waveguides 10 and 20 is further explained in FIGS. 2A and 2B. Two basic configurations are depicted, and differ by the relative angles of the light beams and the facets. In this schematic illustration, the beams a1, a2 and b1 are depicted as same vector (reference will be only to b1) since the same geometrical considerations apply to each as observed from a side view of the corresponding waveguide. Beams a3, a4 and b2 are also depicted as same vector (reference will be only to b2).

Light beams b2 are actually a bundle of rays propagating in same direction as depicted by two vectors in FIG. 2A. In this case, one vector is reflected by the external face to become b1 and onto the internal facet 40 (or 45) where part of it is reflected as c1. The other b2 vector is reflected directly by facet as vector c2. The vectors c1 and c2 represent the normal image and ghost image not necessarily in this order. In this configuration, b1 and b2 impinge on facet 45 from the same side.

Parenthetically, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image.

FIG. 2B describes essentially the same process but where the geometry is such that b1 and b2 impinge on facet 40 (or 45) from opposite sides.

In both cases, the magnitude of reflection for images c1 and c2 in S and P polarizations is determined by the coating on these facets. Preferably one reflection is the image and the other is suppressed since it corresponds to an unwanted "ghost" image. Suitable coatings for controlling which ranges of incident beam angles are reflected and which ranges of incident beam angles are transmitted are known in the art, and can be found described in detail in U.S. Pat. Nos. 7,391,573 and 7,457,040, coassigned with the present invention.

It is particularly preferred to design the system so that "ghost" images do not overlap the main or the conjugate images (c1 overlapping c2). The process of designing the appropriate angle of the beams while maintaining TIR conditions for propagation of the images within the waveguides, and at the same time avoiding ghost-overlap, is described in FIG. 3. This drawings introduces a schematic representation which will be used further below to present additional embodiments of this invention.

Thus FIG. 3 shows a projection of the geometry of waveguides 10 and 20 in which rotations are depicted as distance along the rectilinear axes ("angular space"). The diagram thus represents spherical coordinates in Cartesian coordinates. This representation introduces various distortions, and displacements along the different axes are noncommutative (as is the nature of rotations about different axes). Nevertheless, this form of diagram has been found to simplify the description and provide a useful tool for system design. For clarification, the directions along X, Y and Z axes are marked, according to one sequence of rotations.

The large circles represent the critical angle (boundary of Total Internal Reflection—TIR) of various external faces of the waveguides. Thus, a point outside a circle represents an angular direction of a beam that will be reflected by TIR, while a point inside a circle represents a beam that will pass the face and transmit out of the waveguide. The circles 57 and 59 represent the critical angle of front and back external faces 14*a* and 14*b* of waveguide 10 and 22*a* and 22*b* of waveguide 20. The "distance" between the circles of opposite facets is 180 degrees. The circles 61 and 63 represent the critical angle of the top and bottom external faces 12*a* and 12*b* of waveguide 10. The dotted-dashed lines 65 and 67 represent the orientation of these external faces of the waveguides.

As previously described, the image is injected into the 2D waveguide 10 while experiencing internal reflection. In the following example, all reflections are TIR based, therefore the injected image a1 is shown in FIG. 3 to be outside any circle. A square image in the angular space has a square shape.

As the image a1 is reflected from the external faces 12*a*, 12*b*, 14*a* and 14*b* of waveguide 10 (represented by orientations 65 and 67), it is multiplied to a2, a3, a4 and back to a1 (represented schematically by four curved solid arrows). The reflection of every image has the same angular "distance" from each of faces (lines 65 and 67) as the image itself, but on the other side, according to the optical principle that the angle of reflection equals the angle of incidence.

The orientation of internal facets 40 (in FIG. 1B) is depicted here as a line 70 that is located according to the facets' angular inclination. As images a1 or a2 encounter the facet 70 (40) they are reflected to an equal opposite angular distance from 70 as depicted by the dashed arrow lines onto images b1 and b2, respectively.

Since b1 and b2 are within the critical angle boundary 61 of the bottom external face of first waveguide 10, they will be coupled out of this waveguide and into second waveguide 20.

As images b1 and b2 propagate within waveguide 20 they are mutually exchanged by reflection from front and back external faces 22*a* and 22*b* which have angular orientation 67 (the reflection being depicted as a curved solid double headed arrow).

Finally, image b1 encounters internal facets 45 (FIG. 1A) at orientation 72 and are reflected into image c. Since image c is within the critical angle circle 57, it is coupled out of the second waveguide 20 and onto the eye (47 in FIG. 1A).

In all this configuration, the angle of the internal facets (70 and 72) must not cross the angular shape (square) of any of the images, since crossing like this will cause "ghost" image to overlap a normal image.

Image c can be designed to emerge at an arbitrary angle relative to waveguide 20 (not necessarily perpendicular), as exemplified in FIG. 3, where c is not centered on direction Z.

Facets 40 and 45 preferably are provided with coatings, as mentioned above, which reduce or substantially eliminate reflection of the low-angle images a3, a4 and b2, respectively.

The calculation process described in FIG. 3 was shown schematically in 2D Cartesian coordinates for ease and clarity of representation. Final accurate design of the system is performed in spherical coordinates, as illustrated in FIGS. 4A-4D. FIG. 4A represents the coupling between images a1-a4. FIG. 4B shows the coupling a1 to b1 and a2 to b2 by reflection on facets 40. FIG. 4C represents the coupling between b1 and b2 in second waveguide 20. FIG. 4D represents the coupling from b1 to c by reflection on facets 45.

During the internal reflections within waveguide 10, there can be any number of reflections in every dimension (y or z) per roundtrip as shown in FIGS. 5A-5D. FIG. 5A depicts one reflection per external face. In this condition b1 is originated by a1. However, since the various light beams of different image field have different angles, eventually the orientation of reflection can change as the beams propagate along the x axis of waveguide 10. FIG. 5B depicts a different orientation that can evolve resulting in b2 being generated by a2. Therefore, in every design the generation of both b1 and b2 should be assumed. The aspect ratio of the waveguide 10 can be designed to have more than one reflection per external facet as depicted in FIG. 5C. For different field angle the orientation of the reflections can change as shown in FIG. 5D. In fact, certain particularly preferred implementations of the present invention ensure that waveguide 10 is volumetrically filled with all four conjugate images a1-a4, such that both images a1 and a2 will always be out-coupled to produce b1 and b2, except where special precautions are taken to suppress one of the paths, as discussed further below.

The combined reflections by the external faces and internal facets of waveguides 10 and 20 expand the original injected aperture in both x and y dimensions. Waveguide 10 expands the aperture in the x dimension and waveguide 20 in the y dimension (axes being labeled as in FIG. 1B). The aperture expansion of first waveguide 10 is preferably achieved by filling the waveguide with the image and then coupling the image out of the waveguide via the facets in a continuous manner along the length of the waveguide, all as detailed further below.

Coupling-In Arrangements

In order to obtain uniform intensity across the expanded aperture, the injected initial aperture of the beam should be uniform and should "fill" the waveguide. The term "fill" is used in this context to indicate that rays corresponding to each point (pixel) in the image are present across the entire cross-section of the waveguide. Conceptually, this property implies that, if waveguide 10 were to be cut transversely at any point, and if an opaque sheet with a pinhole was then placed over the cut end, the pinhole could be placed anywhere across the cross-section and would result in a complete projected image. In fact, for the 2D waveguide 10, this would result in projection of four complete images a1, a2, a3 and a4, of which a2 and a4 are inverted.

In order to ensure filling of the waveguide with the input image, a slightly oversize input image should be trimmed to size on entry into the waveguide. This ensures that the multiplied adjacent apertures will not overlap on one hand and will not have gaps on the other. The trimming is performed as the light beam is injected into the waveguide.

Figure 6:
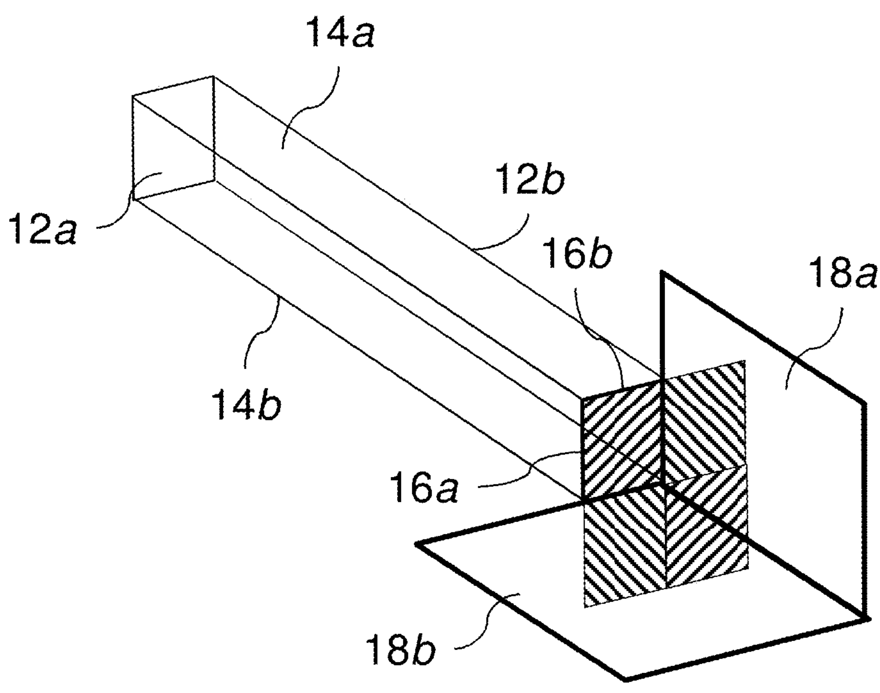
FIG. 6 is a schematic isometric view of a coupling reflector arrangement for coupling-in an image to a 2D waveguide from the optical aperture multiplier of FIGS. 1A and 1B according to a further aspect of the present invention.
Figure 7:
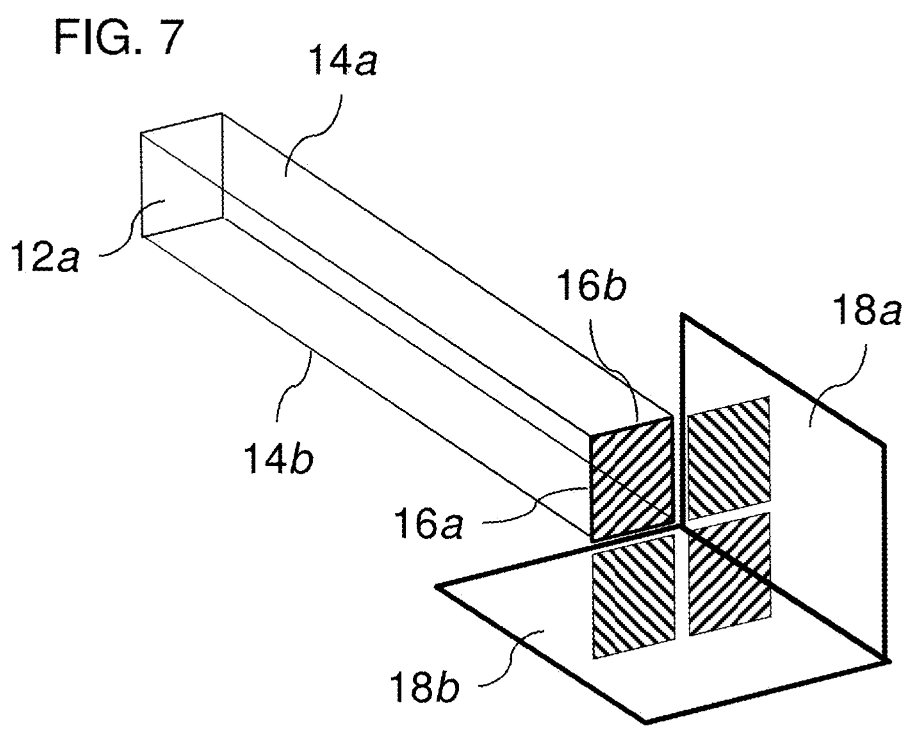
FIG. 7 is a variant implementation of the coupling reflector arrangement of FIG. 6.

A number of configurations for achieving effective coupling-in of an image to first waveguide 10 are illustrated in FIGS. 6-13B. Turning first to FIGS. 6 and 7, these illustrate schematically a free-space mirror-implementation of a coupling-in arrangement for trimming an input image so as to uniformly fill first waveguide 10. In this case, face 12*a* terminates at a first proximal edge 16*a* and face 14*a* terminates at a second proximal edge 16*b*. In order to fill the waveguide fully, it is a particularly preferred feature of certain embodiments of the present invention that the optical aperture multiplier includes a coupling reflector arrangement integrally formed, or optically coupled, with first waveguide 10. The coupling reflector arrangement includes a first reflector 18*a*, deployed as a proximal extension of face 12*b* (FIG. 6), or as a reflector parallel and external to face 12*b* (FIG. 7), having a width perpendicular to the direction of elongation that is greater than a width of surface 12*b*. The coupling reflector arrangement also includes a second reflector 18*b* deployed as a proximal extension of face 14*b* (FIG. 6), or as a reflector parallel and external to face 14*b*, having a width perpendicular to the direction of elongation that is greater than a width of surface 14*b*. As a result of this coupling reflector arrangement, when viewed along an optical input axis (the viewpoint of FIGS. 6 and 7) along which an image is to be introduced, first and second proximal edges 16*a* and 16*b* present an apparent waveguide aperture bounded by the first and second proximal edges and images of the first and second proximal edges reflected in the coupling reflector arrangement, corresponding overall to an apparent aperture which is four times (2×2) the physical aperture. Where the coupling reflectors lie externally to the faces of the waveguide, the apparent aperture is made up of three images of the physical aperture slightly spaced apart from the physical aperture itself, where each aperture is framed by all four edges of the physical aperture. This results in slight inefficiency due to image intensity falling on the "spaces" between the apertures being lost, but filling of the aperture is still achieved.

In one preferred geometry as illustrated here, the optical input axis is oblique to both the first and second reflectors 18*a* and 18*b*. As clearly seen in these drawings, the requirement for the reflectors to have dimensions greater than those of the waveguide is here required in order to ensure that no clipping of the image and incomplete filling of the waveguide occurs. In this manner, the waveguide is reliably filled with all four images across its entire cross-section.

Figures 8A, 8B:
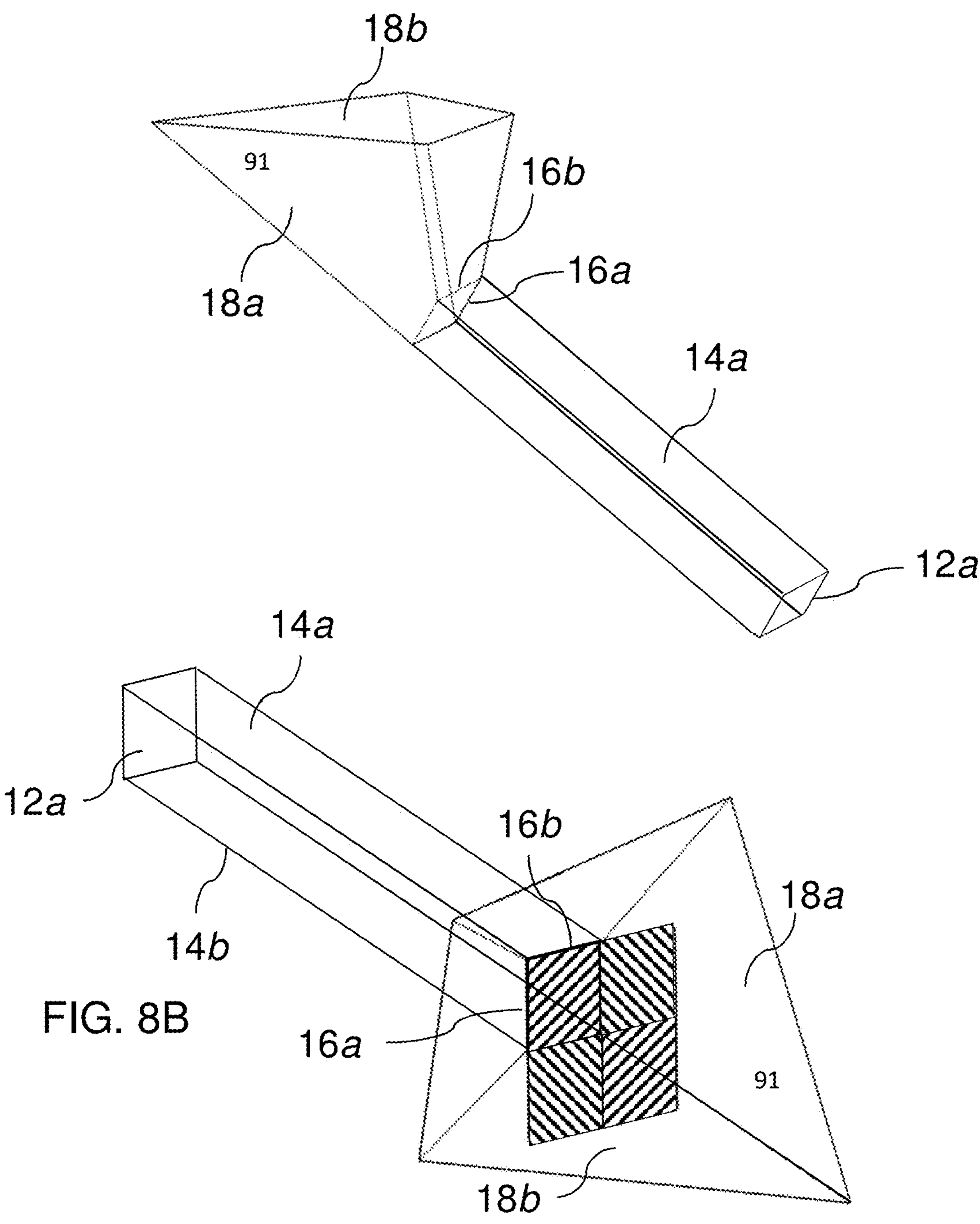
FIGS. 8A and 8B are isometric views from different viewpoints of a waveguide and coupling reflector arrangement equivalent to FIG. 6 in which the coupling reflector arrangement is implemented as part of a coupling prism.
Figures 9A, 9B:
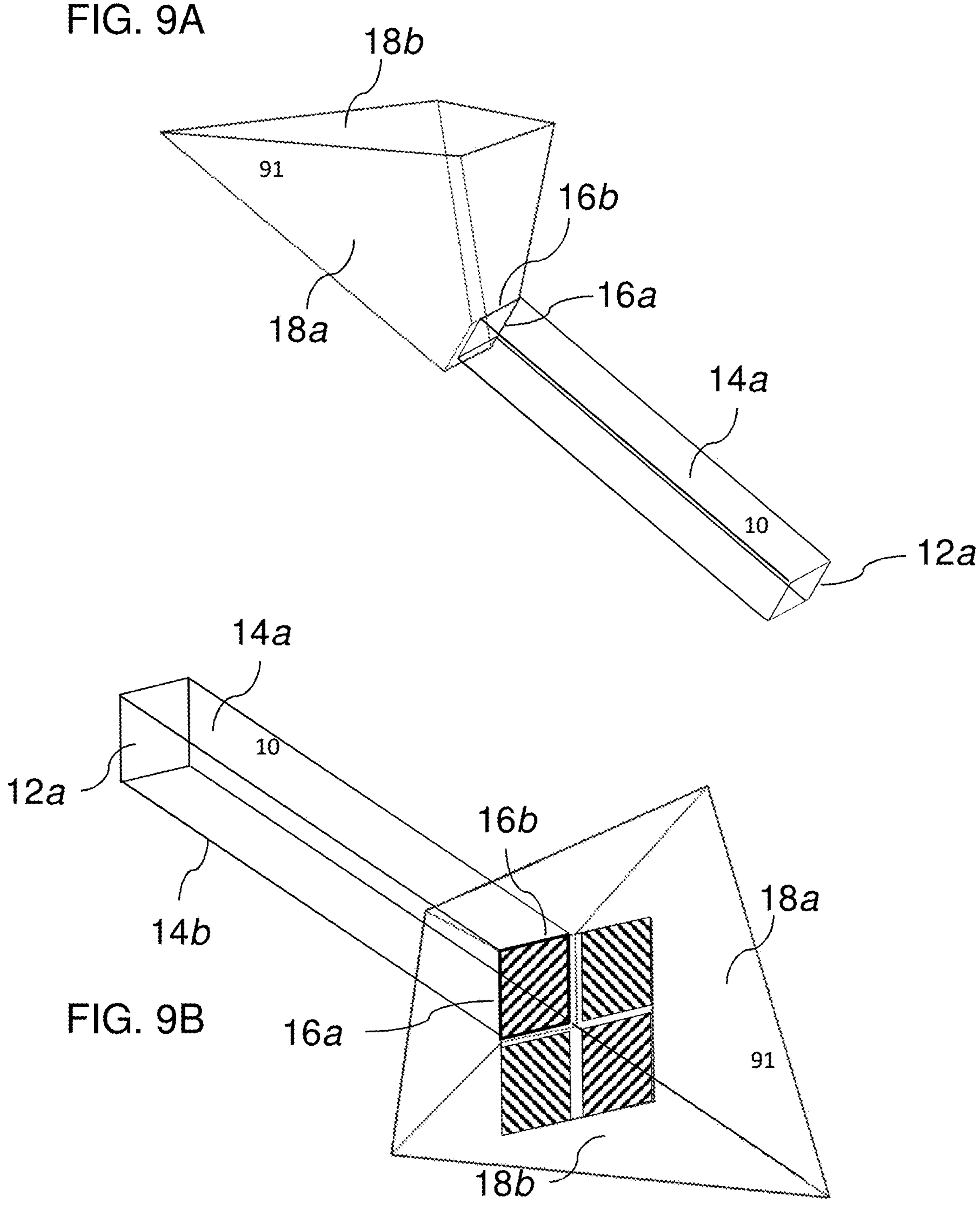
FIGS. 9A and 9B are views similar to FIGS. 8A and 8B, respectively, showing a variant implementation of the coupling prism.
Figure 11:
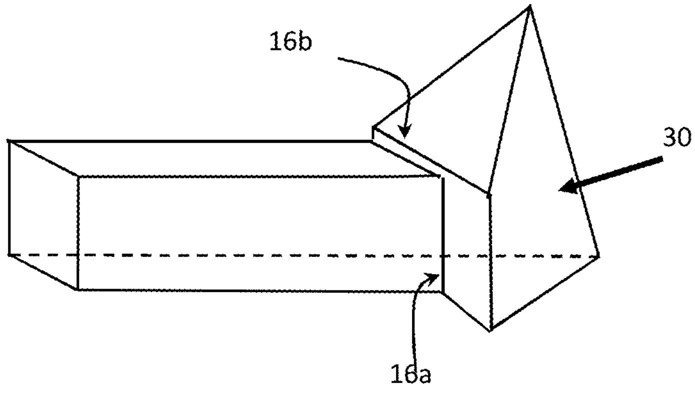
FIGS. 11, 12 and 13A are isometric views of three further variant implantations of the coupling prism and 2D waveguide of FIG. 10A.

While the use of free-space mirrors may in some cases be feasible, it is typically advantageous to implement the coupling reflector arrangement as a coupling prism integrally formed, or optically coupled, with waveguide 10, where first and second reflectors 18*a* and 18*b* are provided by faces of the coupling prism 91. A further face of the coupling prism preferably presents a coupling surface generally perpendicular to the optical input axis, through which the image is introduced. Examples of such an arrangement are illustrated in FIGS. 8A-8B and 9A-9B, where FIGS. 8A-8B are geometrically equivalent to FIG. 6 and FIGS. 9A-9B are geometrically equivalent to FIG. 7. In these cases, the proximal "edges" of waveguide 10 are edges defined by the intersection of coupling prism surfaces with the waveguide surfaces. In this case, the other adjacent surfaces are preferably outwardly angled such that light falling outside those proximal edges will be reflected (or transmitted) in directions that do not enter the waveguide. Optionally, absorbent material may be applied to those surfaces to further prevent stray radiation from reaching undesired locations.

A further example of a coupling-in geometry is illustrated in FIGS. 10A-10C, and explains in more detail the progression of a sample wavefront during coupling-in of an image to the waveguide. In this case, beam 30 is injected having arbitrary initial aperture lateral dimension 81 as measured along the x-axis, as shown in FIG. 10B. The front end of this aperture is trimmed by first proximal edge 16*a* as the beam enters the waveguide. The beam aperture that was trimmed on one side during entrance is reflected by the opposite coupling reflector 18*a* and/or its continuation face 12*b* back to the front face 12*a* where its back side is trimmed once more by the same first proximal edge 16*a*. As the beam propagates along the waveguide, its apertures (84 and 88) are now adjacent without overlapping or gaps, thereby filling the waveguide.

Figure 12:
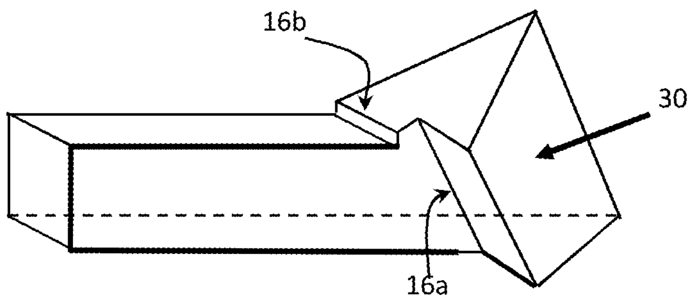

According to a particularly preferred implementation of the present invention, a second dimension of the beam's aperture is trimmed simultaneously by second proximal edge 16*b*. The relative orientations of proximal edges 16*a* and 16*b* are not critical. For example, while in FIGS. 10A-10C edge 16*a* is shown inclined to the longitudinal x-axis, an alternative geometry shown in FIG. 11 where proximal edges 16*a* and 16*b* are both perpendicular to the longitudinal x-axis may in some cases simplify manufacture. The two proximal edges 16*a* and 16*b* preferably intersect at a corner, but this is not necessary as long as the optics is sufficiently wide that the trimming is performed only by proximal edges 16*a* and 16*b* and their reflections. A non-intersecting example is illustrated in FIG. 12.

The trimming in the second dimension occurs in a manner equivalent to that described for the first dimension with reference to FIG. 10B. Thus in FIG. 10C, the initial untrimmed projected image aperture has an initial aperture vertical dimension 92 as measured along the x-axis. As it enters at an angle from section 91 into waveguide 10, its front is trimmed by second proximal edge 16*b*. After the beam 92 is reflected from the opposite external face 14*a* and/or its continuation, its back side is also trimmed by second proximal edge 16*b* to be at appropriate size 94. Consequently, all reflected apertures along this dimension are now also adjacent. The overall result of this trimming in two dimensions is that waveguide 10 is essentially filled with all four images/conjugate images a1-a4, thereby facilitating subsequent uninterrupted expansion of the aperture along two dimensions.

Stops 16*a* and 16*b* can be produced using an absorbing material or as refractive material (such a prism or coating). For example, in FIGS. 10-13, they were depicted as a step shape at the entrance to the waveguide that acts to disperse the access light.

Coupling prism 91 can be manufactured either integrally with waveguide 10 or by attaching two components by known techniques. Certain particularly advantageous approaches to attachment of these components will be described further below.

As pointed out above, the optical axis of the image coupled into waveguide 10 is inclined obliquely to both sets of parallel faces. However, this does not necessarily require oblique orientation of an image projector, since the required angle of image propagation may be achieved by other optical components, such as for example, an additional reflection at an oblique reflecting surface 91*a* of coupling prism 91 deployed to reflect light input along an optical axis perpendicular to the x-axis so as to impinge on the apparent waveguide aperture.

Figure 13A:
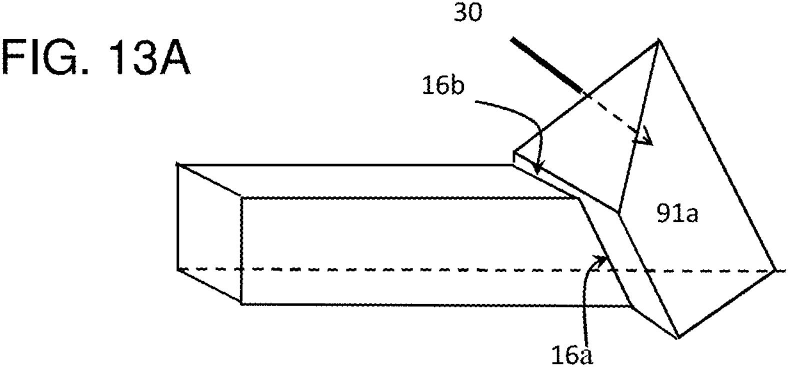
Figure 13B:
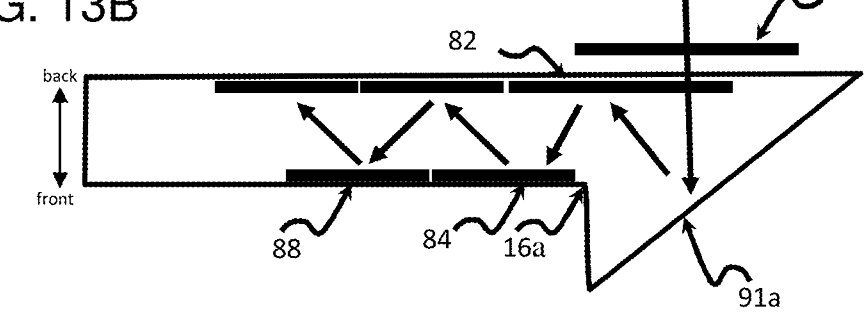
FIG. 13B is a top view of the coupling prism and 2D waveguide of FIG. 13A.

Such an option is illustrated in FIGS. 13A and 13B, where oblique reflecting surface 91*a* provides a back mirror. As depicted in FIG. 13B, the arbitrary (oversized) aperture 81 enters the waveguide to be reflected by reflecting surface 91*a* while being trimmed by 16*a*. After one reflection 82, the back side of the aperture is trimmed 84 by the same edge 16*a*.

The extra light of 81 is trimmed by edge 16*a* using two mechanisms: at entrance, the extra light continue propagation and transmitted outside over the edge (to the left of) edge 16*a*, while after reflection 82 to 84, the back side of the wave front is to the right of edge 16*a* therefore being reflected once more by 91*a* to angles outside TIR or outside the relevant Image.

Edge 16*b* continues to trim the perpendicular axis as before in the other dimension. Optionally, mirror 91*a* may be inclined about two axes so as to generate a desired direction of propagation of the image when the input image 30 is perpendicular to one face of the waveguide.

Thus, in summary, coupling of the image/beam into waveguide 10 at a desired angle can be achieved using a prism, a mirror placed in front, behind or within the waveguide, or other known methods. All of these methods are practical as long as the double-stop configuration described is present.

Figure 14A:
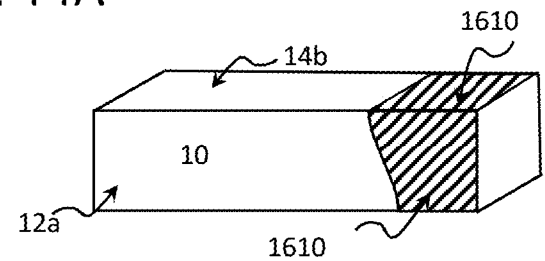
FIGS. 14A-14C are schematic isometric views of three stages during the production of the coupling prism and 2D waveguide of FIG. 10A according to a further aspect of the present invention.
Figure 14B:
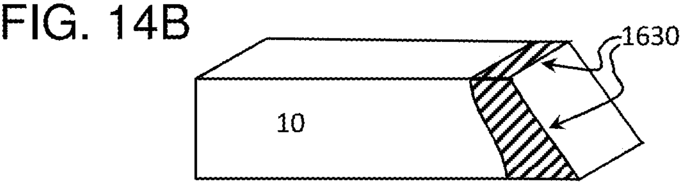
Figure 14C:
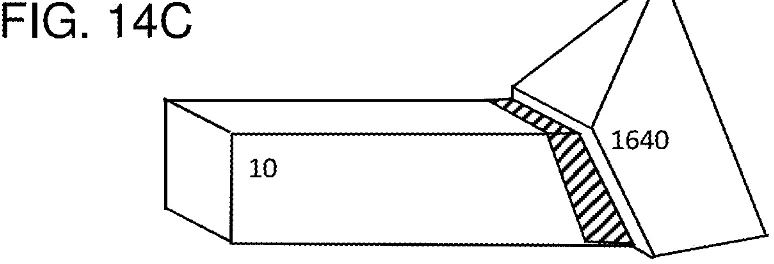

In order to achieve uniform intensity across the extended aperture, it is preferable that trimming edges 16*a* and 16*b* should be clean edges with minimal deviations and scattering. Residues of glue or other perturbing elements can cause degradation in uniformity. FIGS. 14A-14C illustrate an additional aspect of the present invention, applicable also in other contexts where optical elements are to be joined, which facilitates formation of a clean trimming edge (or in other applications, continuous outer surface). The relevant external faces (12*a* and 14*b*) of waveguide 10 are first coated by a reflective or protective coating 1610. The edge of the waveguide 10 is then polished according to the required trimming edge 1630 (16*a* and 16*b*) and finally prism 1640 is attached. In this attachment, the other two faces (on the rear side of the view as illustrated) must be an accurate continuation of the external surfaces of waveguide 10 to provide the coupling reflectors as continuations of those faces. If these faces are not continuous (as in FIG. 9*b*), then the reflective coating 1610 should preferably cover the opposite faces (12*b* and 14*a*) as well. This approach is relevant also to systems with 1D waveguides. The angle of the coupling surfaces may be any orientation.

It should be noted that the above technique, namely providing a protective dielectric or reflective coating prior to finishing of a surface for coupling two optical components, addresses a widespread problem beyond the specific application described herein. Specifically, whenever two components are to be joined so as to provide an optical path from one to the other, the components must be joined by suitable optical adhesive, typically index-matched to the components. In order to ensure optimal optical coupling, the entire interface surface should be fully covered with the adhesive. On the other hand, precisely because of the desired optical properties of the adhesive, any overspill of adhesive from the interface to an external surface of the component will typically compromise the optical properties of the component. By preemptively coating the adjacent surfaces with a protective coating, preferably prior to polishing of the interface surface, the impact of any overspill of adhesive onto the external surfaces can be reduced or eliminated. Where two components are to be coupled so that certain surfaces will be flush after coupling, such coating may advantageously be provided on both components prior to coupling. In certain applications, coating on only one side, or a subset of the faces, may be sufficient, for example, where any excess glue on certain surfaces could be readily removed after bonding by a further polishing step.

The above implementations of coupling-in arrangements are preferably used together with an image projector deployed to project an image collimated to infinity along the optical input axis so as to fully overlap the apparent waveguide aperture. Any suitable type and technology of image projector may be used, including various free-space image projectors. In certain cases, in order to provide a particularly compact and rugged implementation, the image projector may be mechanically integrated (i.e., integrally formed or rigidly interconnected) with a coupling prism. Various implementations of this type will now be described with reference to FIGS. 15-18.

Figure 15:
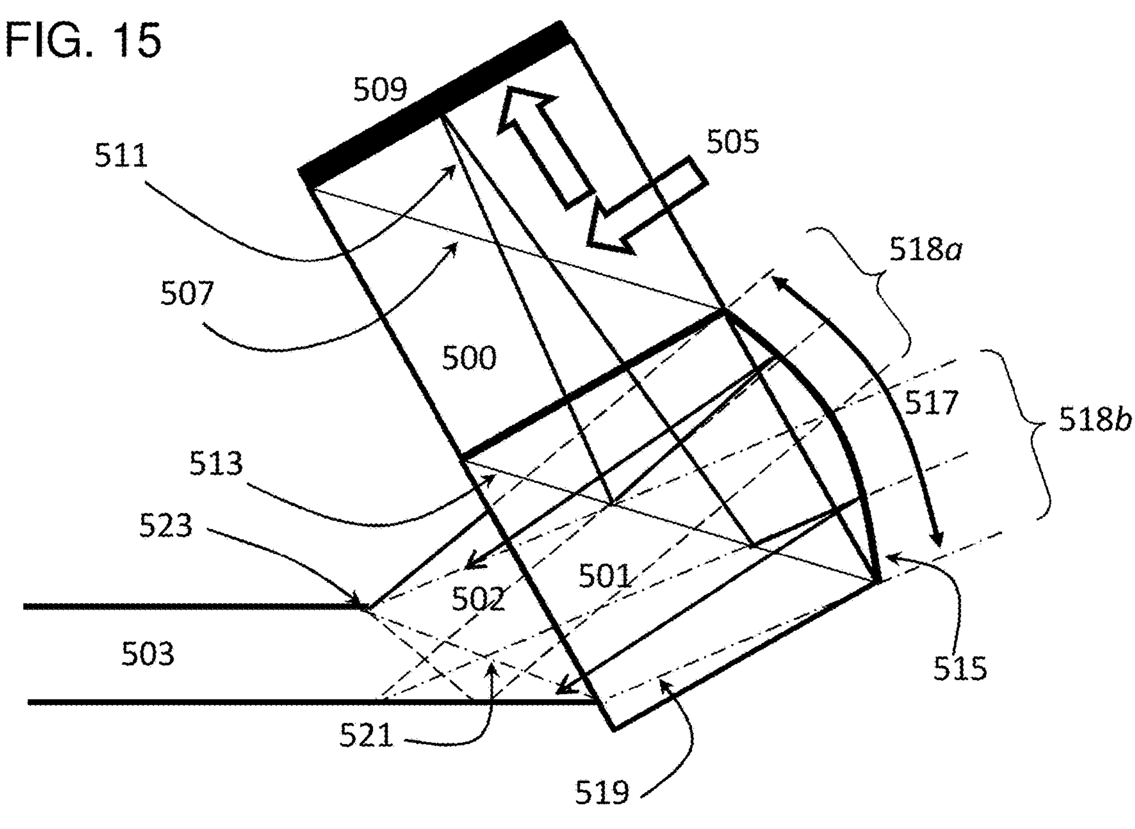
FIG. 15 is a schematic side view illustrating integration of an image projecting arrangement with a 2D waveguide according to a further aspect of the present invention.

Referring first to FIG. 15, this illustrates an adaptation of the compact image projector of PCT Patent Publication No. WO 2015/162611 for use in the context of a 2D waveguide, here numbered 503. It includes Illumination Polarizing Beam Splitter (PBS) 500, a collimating PBS 501, a coupling prism 502 (equivalent to 91 in FIGS. 10A-10C) coupling into waveguide 503.

In the following description, the polarization management components (including wave plates and polarizers) are omitted for clarity. The illumination light 505 enters the illumination prism 500 and is reflected by internal surface 507 onto the image generator 509, such as a liquid crystal on silicon (LCOS) display. Light 511 reflected from the display passes into collimating prism 501 where surface 513 reflects the light onto a surface 515 with optical power to achieve collimation of the light to form a projected image at infinity. The collimated light passes in through coupling prism 502 to waveguide 503.

Surface 515 has a width 517 that is chosen to be sufficient to provide all of the input image angles required to "fill" waveguide 10 with the entire field of view (FOV) of the image, from a highest angle image angle 518*a* to a lowest image angle 518*b*, and including a lowest light ray in the FOV designated 519. The required size of surface 515, in turn, determines the required size of prisms 501 and 500. More specifically, as described above with reference to FIGS. 6-10C, it is desired for the waveguide 10 to be filled with the image and its conjugate images, meaning that the entire range of beam angles encompassed by the image should be incident on the entire width of the physical aperture of the waveguide as well as the image of that aperture in the coupling reflectors. By tracing these rays backwards from the waveguide aperture through the collimating PBS 501, it is possible to determine the minimum required width 517 of the collimating PBS, and hence also of the illumination/image-generating PBS 500. Proximal edge 523 (corresponding to edge 16*a* above) then performs trimming of the image wavefront as described above.

FIG. 15 illustrates only one dimension, but the axes of the waveguide are tilted relative to those of the PBS such that this same image trimming occurs in both dimensions, as described above.

According to a further aspect of the present invention, which may be used to advantage also for coupling in an image to an otherwise conventional 1D waveguide, it is possible to incorporate part or all of coupling prism 502 into collimating prism 501, thereby reducing the size of the system. Put in alternative terms, part of collimating PBS 501 lying below/beyond surface 513 may be cut away to provide the required coupling reflector surfaces.

Figure 16:
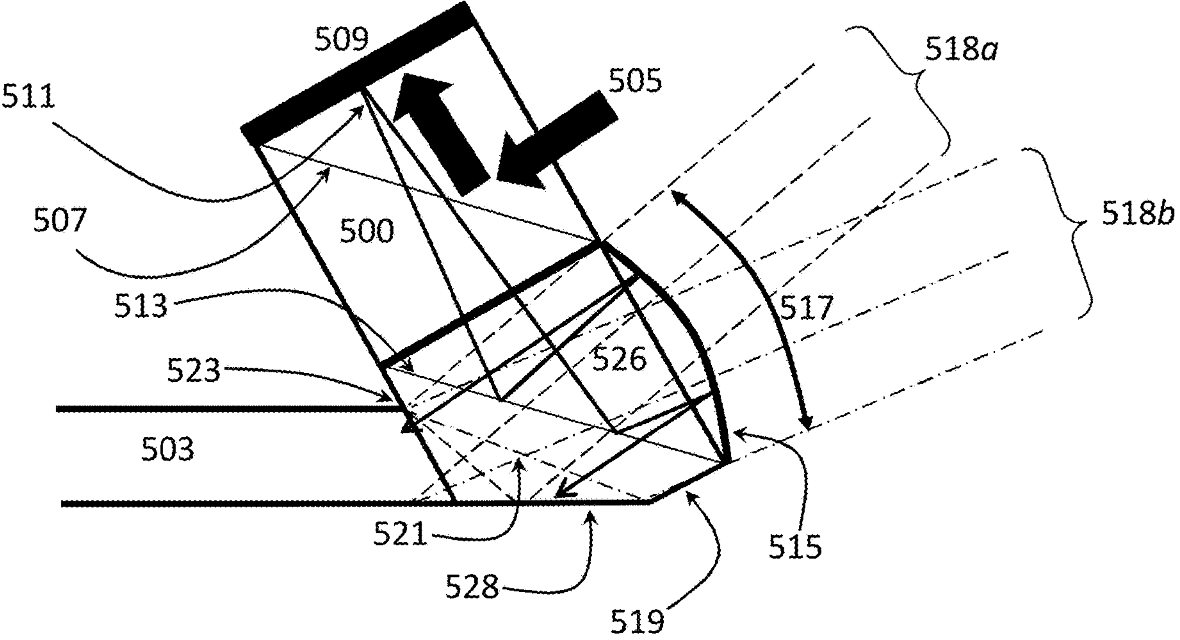
FIGS. 16 and 17 are schematic side views illustrating two variant implementations of the integrated image projecting arrangement and 2D waveguide of FIG. 15.

One example of this approach is illustrated here in FIG. 16. In this figure, the light propagates as in FIG. 15, and the same numbering is used. Here, the collimating prism 526 differs from prism 501 in that it abuts proximal edge 523 and has a modified bottom face 528 forming a continuation of the bottom surface of waveguide 503 to provide the coupling reflector. In this configuration, the distance between the optical face 515 and the trimming edge 523 is substantially shorter than in the implementation of FIG. 15. By tracing rays backwards from the optical aperture and the apparent optical aperture across the entire desired angular field of view, it may be seen that the required dimensions of the face 515 (and consequently of prism 526) are reduced. This in turn enables reduction of the dimensions of image generating PBS 500.

Figure 17:
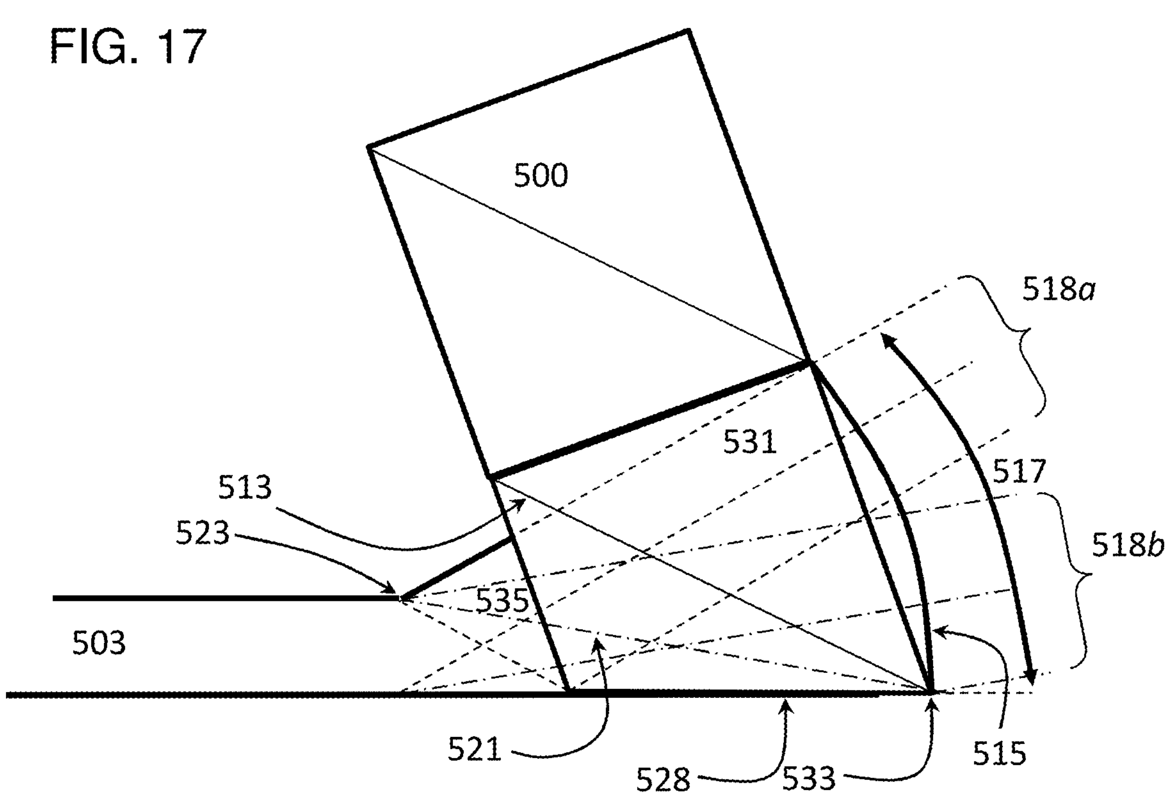
Figure 18:
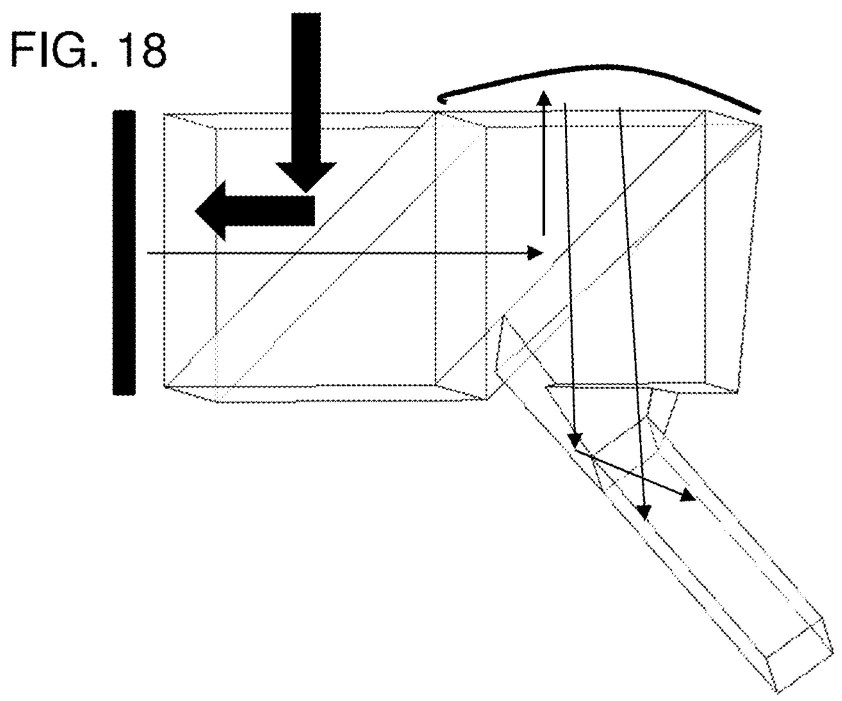
FIG. 18 is an isometric view of an exemplary implementation of the principles of FIGS. 15-17 in three dimensions.

The examples of FIGS. 15-17 illustrate cross-sectional geometry suitable for implementation with either a 1D waveguide or a 2D waveguide. When coupling into a 2D waveguide, the prism 526 (and 500 adjacent thereto) are at a two dimensional tilt angle relative to waveguide 503 (as shown for the coupling-in face of coupling prism 91 in FIGS. 10A-10C). Therefore, the geometry shown in FIG. 16 is reproduced in the other axis (with different angles). A second face of prism 526 perpendicular to face 528 will also be a continuation of a second surface of waveguide 503 (waveguide 10 in the previous figures). A three-dimensional representation of such an assembly is illustrated in FIG. 18. In this case, the orientations of the image-generating element, the prisms and the waveguide may be at arbitrary rotations relative to each other, all according to the requirements of each specific design.

The configurations of prism 526 according to this compact implementation preferably satisfy the following conditions:

1) The light from the optical face 515 is reflected directly onto the waveguide and not being reflected by surface 513 (equivalent to the above description of FIG. 15).
2) The image of the trimming edge 523 (represented for the shallowest-angle part of the image by beam 521) must not be truncated, not by reflecting surface 513 and not by external faces of prism 526.
3) Surface 528 must be continuation of the waveguide surface.
4) For a two-dimensional waveguide, the above conditions should be satisfied in both dimensions of the waveguide.

FIG. 17 illustrates how these limitations may dictate the degree to which it is possible to incorporate coupling prism 502 into a collimating prism 531. In this example, the coupling angle into the waveguide is very shallow. As a result, the coupling prism (before being incorporated) would have been very large and so would be the collimating and illumination prisms. In this embodiment the coupling prism was incorporated into collimating prism 531 only to the point where the image of the trimming edge for the shallowest angle portion of the image (represented as 521) is not compromised by the external face of the prism 531. This point 533 becomes the edge of the coupling prism. The dimension 517 of optical element 515 is then dictated by the steepest angle portion of the image which must reach edge 523 unobstructed. Since collimating prism 531 of this dimension would fall short of direct abutment with edge 523, a small coupling prism 535 is provided at the entrance to waveguide 503.

In each of the above options for coupling-in of images into waveguide 10, the solutions presented are considered to be advantageous for any out-coupling applications such as the partially-reflective facet coupling-out approach discussed above, slanted-face coupling out (such as disclosed in PCT patent publication no. WO 2017/141242 A2) or for applications using diffractive elements for coupling-out. Slanted-face and diffractive elements used for coupling-out a proportion of the radiation impinging internally on a surface of a waveguide are known in the art, and will not be described here in detail.

Coupling Between First and Second Waveguides

The coupling from first waveguide 10 into second waveguide 20 according to the configuration of FIGS. 1A and 1B requires precise alignment of the waveguides in order to maintain image quality without creating double images. Specifically, as best illustrated in FIGS. 1A, 3 and 5D, two output images a1 and a2 of the images in first waveguide 10 are coupled into second waveguide 20, and continue to interchange with each other as conjugate images b1 and b2 propagating along waveguide 20. In order to achieve good quality, the external faces of waveguides 10 and 20 should be precisely parallel or perpendicular to each other. According to the embodiment of FIGS. 1A and 1B, waveguide 10 is placed on top of waveguide 20. Parenthetically, wherever reference is made herein to directions such as up, down, top, bottom etc., these terms are used only for ease of presentation and refer to the arbitrary orientations as illustrated in the drawings. The final device may be deployed in any required orientation. Furthermore, there is no limitation on the relative orientation of the coupling-in arrangement for introducing an image to the first waveguide and the coupling-out arrangement for coupling an image from the first waveguide to the second.

FIGS. 19A-19C illustrate a different configuration according to an embodiment of the present invention for coupling the waveguides by placing first waveguide 10 adjacent to one of the parallel faces of second waveguide 20, as best seen in FIG. 19A. The light propagates in first waveguide 10 from right to left as shown, as described above with reference to FIG. 1A, and encounters the internal facets of waveguide 10 (visible in the top view of FIG. 19C) which are here oriented to deflect the deflected image so as to couple the image into the face of second waveguide 20 through an intermediate refractive layer 99 (discussed further below). The coupling is at an angle chosen so that the light beam continues to reflect within second waveguide 20, preferably through TIR (solid arrows in FIG. 19B). The conjugate beam that couples into second waveguide 20 in the conjugate direction (dashed arrow in FIG. 19B) propagates to the adjacent end of second waveguide 20 and is lost by outward scattering.

In this implementation, filling of second waveguide 20 with the coupled-in image from first waveguide 10 is preferably achieved by choosing a width of first waveguide 10 sufficient such that a light beam 101 emerging at an angle from the far end (top as shown in FIG. 19B) of waveguide 10 for the most shallow-angle region of the image will not overshoot the other end 102 of first waveguide 10.

In order to implement the configuration of FIGS. 19A-19C, a number of conditions must be met. Firstly, in order to support propagation along first waveguide 10, the light beam introduced into waveguide 10 must be reflected by the interface with refractive layer 99. After reflection by the internal facets of waveguide 10, the light beams should be coupled out through refractive layer 99 into second waveguide 20, but should not escape from the opposite external face of waveguide 20. FIG. 20 depicts in spherical coordinates an approach for implementing this configuration so as to satisfy the above conditions.

Thus, in FIG. 20, the images 106LU, 106RU, 106LD and 106RD are equivalent to a1, a2, a3 and a4 of FIG. 1A. The critical angle between the waveguide and air is represented by circles 107 and 108, which are equivalent to 61 and 63, respectively, in FIG. 3. The circle 109 represents the critical angle between waveguide 10 and intermediate refractive layer 99 of FIGS. 19B and 19C. Since the ratio of refractive indices of the waveguide and refractive layer 99 is smaller than to air, the TIR circle is larger than at the air boundary. The four conjugate images propagating along first waveguide 10 are all outside both circles 107 and 109, so that the images propagate through TIR along the waveguide. As 106LU encounters the internal facet of waveguide 10 (process described as image c2 in FIG. 2A), it is coupled onto 110LU (equivalent to b1 in FIG. 1A) while 106RU is coupled to 110RU. The beams 110LU and 110RU are within the critical angle 109 but outside the critical angle 107. As a result, they will effectively couple out of waveguide 10 through layer 99 and into waveguide 20, but will not couple out to the air from the external faces of waveguide 20.

As 110LU and 110RU are reflected within second waveguide 20, they generate their corresponding conjugate images 110LD and 110RD, respectively. These reflections are equivalent to b2 in FIG. 1A.

As mentioned above, in this implementation, 110RU and 110RD are scattered out as described by the dashed arrows in FIG. 19B. Images 110LD are coupled-out to the eye by the internal facets of second waveguide 20 (as was illustrated above at 45 in FIG. 1A).

Figure 21A:
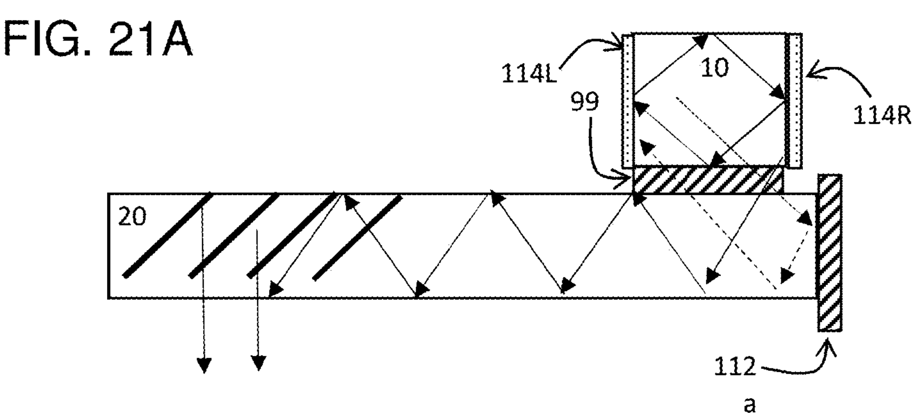
FIGS. 21A-21C are schematic side views illustrating three variant implementations of coupling geometry between a 2D waveguide and a 1D waveguide according to teachings of the present invention.
Figure 21B:
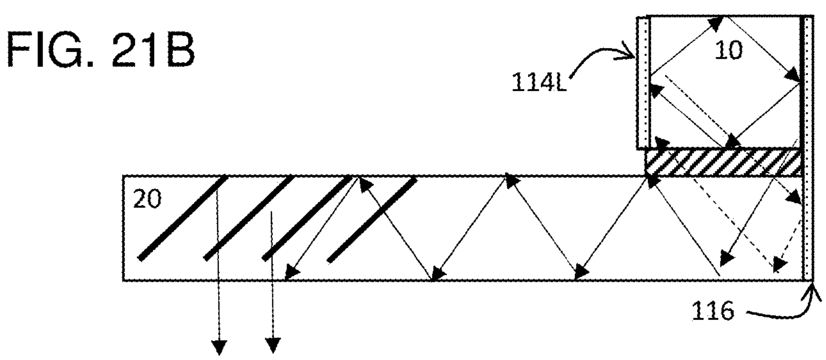

Variant implementations of this embodiment are illustrated in FIGS. 21A and 21B. In FIG. 21A, beams 110RU and 110RD (depicted as dashed arrows) are reflected to overlap and reinforce 110LU and 110LD (solid arrows). This combination is achieved by introducing a reflector 112 perpendicularly and at the end of second waveguide 20 as shown in FIG. 21A. This reflector may cause some part of images 110RU and 110RD to be reflected back and reenter first waveguide 10 in the opposite direction. It may be desirable to provide reflective coatings on the two opposite external facets 114R and 114L of first waveguide 10 to contain these beams after being reflected by the internal facets.

FIG. 21B illustrates a configuration which combines first waveguide reflector 114R with second waveguide reflector 112 as a single reflector 116 while maintaining same functionality as the configuration of FIG. 21A.

Figure 21C:
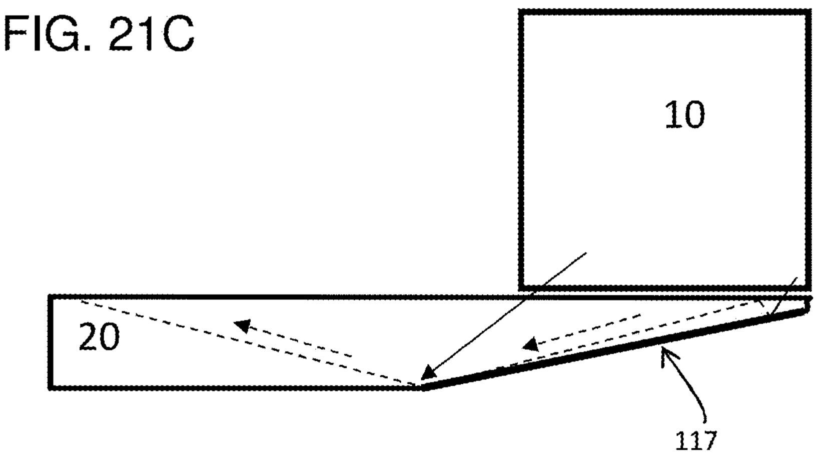

In 21C, waveguide 10 is also adjacent to waveguide 20, spaced by an intermediate dielectric or air-gap. The light coupled-out from waveguide 10 (solid arrows) is reflected by a back mirror 117 on waveguide 20 in a process similar to the process described above with reference to FIGS. 13A and 13B. The angle of mirror 117 is chosen to match the transmitted light from waveguide 10 to the required guided light angle in waveguide 20 (dotted line). In some cases, mirror 117 extends beyond the edge of waveguide 10 (as shown in FIG. 21C), depending on the coupling-out angles generated by the implementation of waveguide 10 and the image propagation angles used.

Different geometries of image coupling-out by internal facets (or diffractive optical elements) can be applied to the implementations of FIGS. 19A-21C such as, for example, the various geometries and appropriate coatings described above with reference to FIGS. 2A and 2B.

The implementations of FIGS. 19A-21B (NOT 21C) are somewhat limited in the available field of view by the geometrical requirements described with reference to FIG. 20. Nevertheless, for a range of applications, this option may be particularly advantageous due to considerations of simplicity of the design and ease of manufacture.

Figures 22A, 22B, 22C, 22D, 22E:
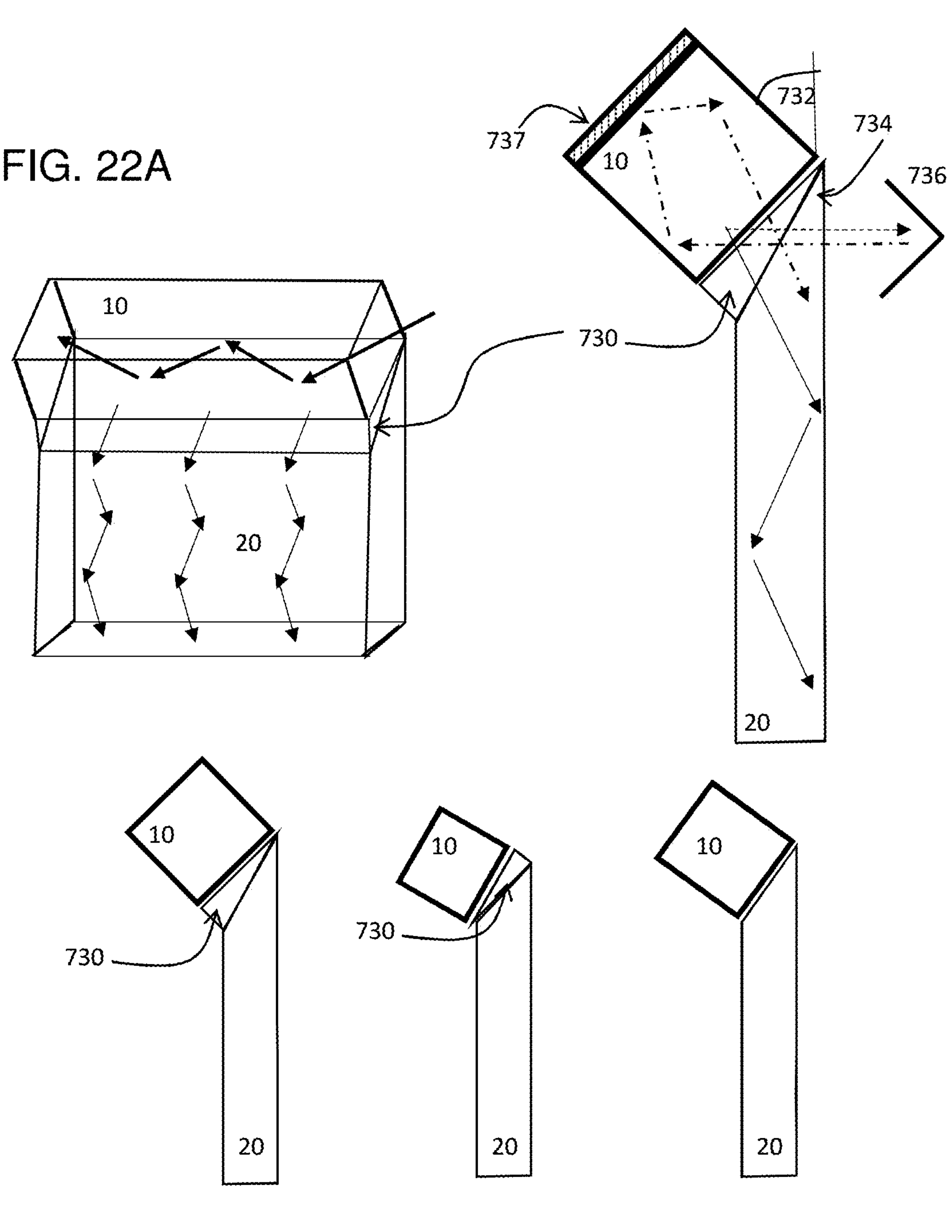
FIGS. 22A and 22B are schematic isometric and side views, respectively, illustrating a further variant implementation of coupling a geometry between a 2D waveguide at an oblique angle to a 1D waveguide according to an implementation of the present invention.
FIGS. 22C-22E are schematic side views similar to FIG. 22B illustrating various variant implementations.

A further set of implementations of coupling between first waveguide 10 and second waveguide 20 is illustrated in FIGS. 22A-22E. In these implementations, the 2D waveguide 10 is inclined relative to the second waveguide 20 so that only one of the images coupled-out from waveguide 10 is contained and guided within waveguide 20, as shown in FIG. 22B. First waveguide 10 may be mounted at a required inclination relative to 1D waveguide 20 by use of an intermediate transparent wedge 730. This inclination is chosen so as to couple one image from waveguide 10 (solid arrow, analogous to the solid arrow of FIG. 19B) and not to couple the other image from waveguide 10 (dashed arrow, analogous to the dashed arrow of FIG. 19B). The uncoupled image is absorbed by external absorber, for example 736 or directed in a direction where it will not be visible to the observer. Alternatively, 736 can be a 1D retro-reflector that reflects the light (dot-dash arrow) back into waveguide 10 in the opposite direction and couples into waveguide 20, equivalent to dashed arrow in FIGS. 21A-21B. According to this option, a reflecting coating 737 may be provided on at least one of the external facets of 2D waveguide 10, as shown in FIG. 22B. For clarity of presentation, the internal facets of the waveguides have been omitted from these drawings.

The inclination of waveguide 10 relative to waveguide 20 can be chosen according to the required angles of the waveguides and the images propagating between them, and may employ a transparent wedge coupling prism 730 to either decrease the inclination relative to an inclined coupling surface of second waveguide 20, as shown in FIG. 22C, to increase the angle as shown in FIG. 22D. In one particularly preferred implementation as illustrated in FIG. 22E, the required inclination angle of first waveguide 10 relative to second waveguide 20 matches the angle of the second waveguide coupling surface, so that no intermediate coupling prism is needed. In order to implement this option, the output angle of the image coupled into second waveguide 20 must be matched to the required propagation angle within waveguide 20, and the extent of the wedge formed by inclined end surface 734 and the dimensions of waveguide 10 must be such that filling of second waveguide 20 with the image and its conjugate are achieved, in a manner analogous to that described above with reference to FIGS. 6-12 above.

In each case, an interface discontinuity is required on the output face of first waveguide 10 to ensure that the waveguide properties are not compromised. In the implementations illustrated in FIGS. 22A-22E, the intermediate medium providing an optical discontinuity between waveguide 10 and waveguide 20 is air, but any other refractive material or coating may also be used. Options include a diffractive grating which may also perform the output coupling, as an alternative to the internal partially-reflecting facets described above.

Thus FIGS. 22A-22E illustrate an inclination of waveguide 10 according to which first waveguide 10 is optically coupled to an end surface 734 of second optical waveguide 20 that extends between, and is obliquely angled relative to, third pair of parallel faces 22*a*, 22*b*. This type of inclination may be combined with all other variant configurations presented herein such as, for example, the various different types of internal facet inclination described below with reference to FIGS. 26-29.

Figures 23, 24:
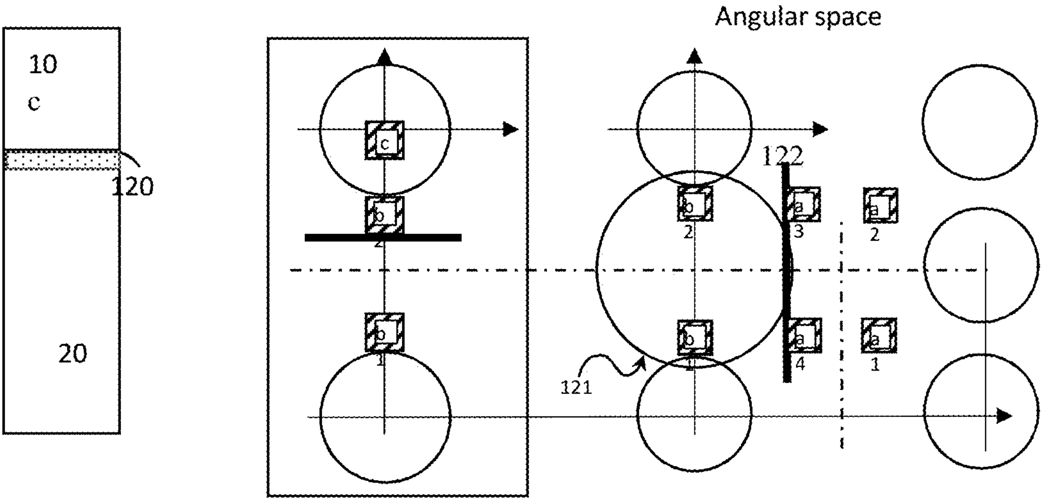
FIG. 23 is a schematic side view of an optical aperture multiplier similar to that of FIG. 1A, but employing a refractive layer interposed between two waveguides.
FIG. 24 is a representation similar to FIG. 3 illustrating the relevant angular relationships for the device of FIG. 23.

Turning now to FIGS. 23 and 24, these relate to an implementation that is essentially similar to that of FIGS. 1A-1B described above, but illustrates a number of variable features. Thus, FIG. 23 shows an implementation in which an intermediate refractive layer 120 is interposed between waveguides 10 and 20. This layer should preferably be thin, and can be made of various materials or multilayer coatings. The presence of layer 120 functions to enlarge the critical angle circle 61 of FIG. 3, illustrated here as critical angle circle 121 in the angular space diagram of FIG. 24. By suitable choice of refractive indices, it is possible to select the size of this critical circle, thereby providing an additional degree of freedom in the optical design, and in some cases facilitating implementations with a larger FOV than could be achieved with an air gap.

In an independent aspect, FIG. 24 also depicts an implementation in which a3 and a4 are on the same side of the angle 122 of the facets in waveguide 10 relative to a1 and a2. This is equivalent to the scenario of C1 in FIG. 2A.

As a further independent aspect, FIG. 24 also depicts a configuration where waveguides 10 and 20 are formed from materials with different refractive indices. To represent the different resulting properties, the geometrical properties of second waveguide 20 are plotted separately in FIG. 24 on the left side of the drawing, and angular sizes of the images and of the critical angle circles are different in the two plots.

All of the above variants may be used in combination with any of the embodiments described herein to provide additional degrees of freedom in the system design, as will be clear to a person having ordinary skill in the art.

In various embodiments of the present invention, precise alignment and structural stability in the relative positioning of the components, and particularly the two waveguides, can be critical to ensuring high image quality. FIGS. 25A-25D a number of different options for assembly of a device according to the present invention, and which provide various additional advantages.

Figures 25A, 25B, 25C, 25D:
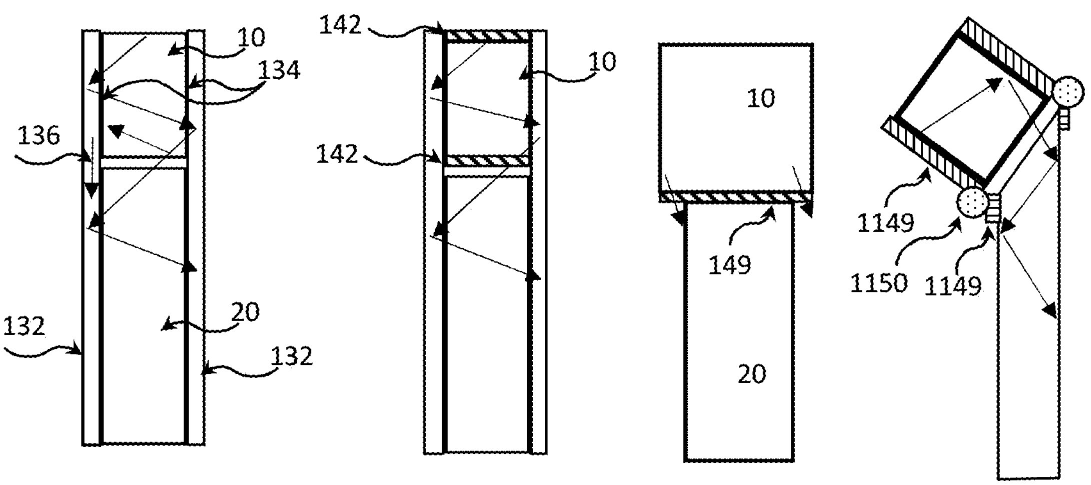
FIGS. 25A-25C are side views of a device similar to that of FIG. 1A illustrating various implementation options for mechanical interconnection of the two waveguides.
FIG. 25D is a side view of a device similar to that of FIG. 22E illustrating an implementation option for mechanical interconnection of the two waveguides.

FIG. 25A illustrates a first option for implementing waveguide 10 on top of waveguide 20 while maintaining external face surface quality, parallelism and perpendicularity so as to preserve image quality. According to this option, a continuous common external cover 132 is provided for waveguides 10 and 20. According to one preferred option, External cover 132 is optically matched with the material of the waveguides so that the actual waveguide is in fact defined by the external faces of cover 132, while the internal facets are only provided between the inward-facing interfaces 134 of the cover. In this case, external cover 132 should be as thin as possible to minimize the optical leakage 136. The gap depicted between waveguides 10 and 20 may be an air gap or a refracting gap for critical angle management.

FIG. 25B shows an implementation similar to that of FIG. 25A, but with the addition of optical covers 142 also along the top and bottom of waveguide 10. Use of such covers may facilitate obtaining high optical quality (smoothness) along these faces as well.

FIG. 25C shows an implementation in which waveguide 10 is slightly wider than waveguide 20 in order to ensure complete coverage (filling) of the entrance to waveguide 20 despite any gap or deviation in attachment between the waveguides. In this case, a layer of intermediate refractive material 149 preferably covers the entire bottom surface of waveguide 10.

FIG. 25D relates to an implementation with geometry similar to FIGS. 22A-22E, implemented with an air-gap between the two waveguides. In order to fix the relative positions of the waveguides and seal the air-gap between them with minimal perturbation of the internal reflections in the waveguides, a reflective coating 1149 is preferably applied on external faces of the waveguides, at least in the region when joining is to be performed. A joining attachment 1150 then attaches to each of those coatings to interconnect the waveguides mechanically, and preferably also generate a seal. The coating can be localized close to the gap, or can extend to cover the entire lateral faces of the 2D waveguide.

Coating 1149 may be a metallic reflective coating, or may be a dielectric coating chosen so that grazing angle of image light is reflected while steeper light rays from scattering or any undesired images will be transmitted out.

Figure 26:
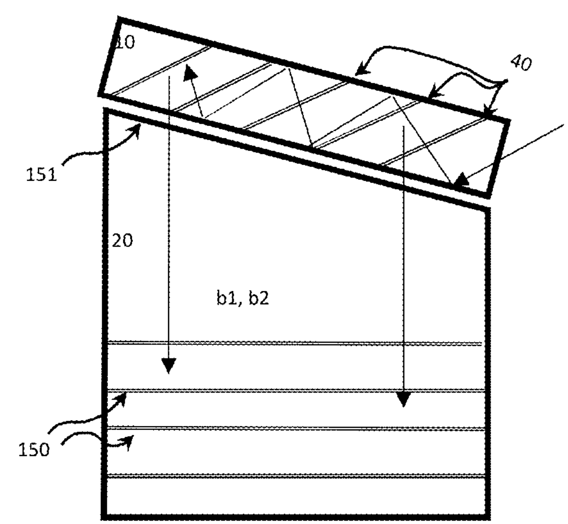
FIG. 26 is a front view of a device similar to that of FIG. 1B illustrating a relative inclination between the first waveguide and a direction of image propagation in the second waveguide.

Turning now to FIG. 26, in this implementation, the extensional direction of waveguide 10 is inclined (non-parallel) relative to the extensional direction of the facets within second waveguide 20. In other words, the partially reflective surfaces (facets 45) of second waveguide 20 intersect face 22*a* at a set of parallel lines 150, and the coupling-in end surface of second waveguide 20 meets face 22*a* at an edge 151, the edge being non-parallel to the set of parallel lines. This inclination changes the out-coupling angle of the image and may be used in order to meet requirements for ergonomic design in certain applications, or may simplify certain angular design limitations. These angular limitations include the restriction not to exceed the critical angle (image rectangle not crossing a circle) or the requirement not to have ghost image overlapping a normal image (image rectangle not crossing a facet line such as 122 in FIG. 24).

In the implementation of FIG. 26, the angles of the facets within first waveguide 10 are chosen so that the linked-out images supplied to second waveguide 20 propagate perpendicular to the second waveguide facets.

The inclination of waveguide 10 relative to 20 can alternatively be in the opposite sense from that illustrated here, depending on the facet configuration (options of FIGS. 2A and 2B), the coupling method (FIGS. 19A-23), the required image FOV, and/or the critical angle to air and between the waveguides (FIG. 24).

Figure 27:
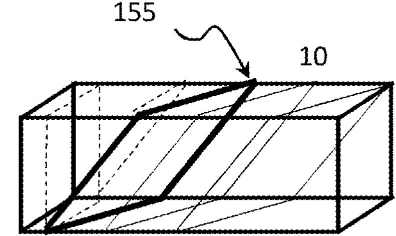
FIG. 27 is a schematic isometric view illustrating an implementation of a 2D waveguide with internal partially reflective facets inclined obliquely relative to relative to both sets of elongated parallel external faces.
Figure 28:
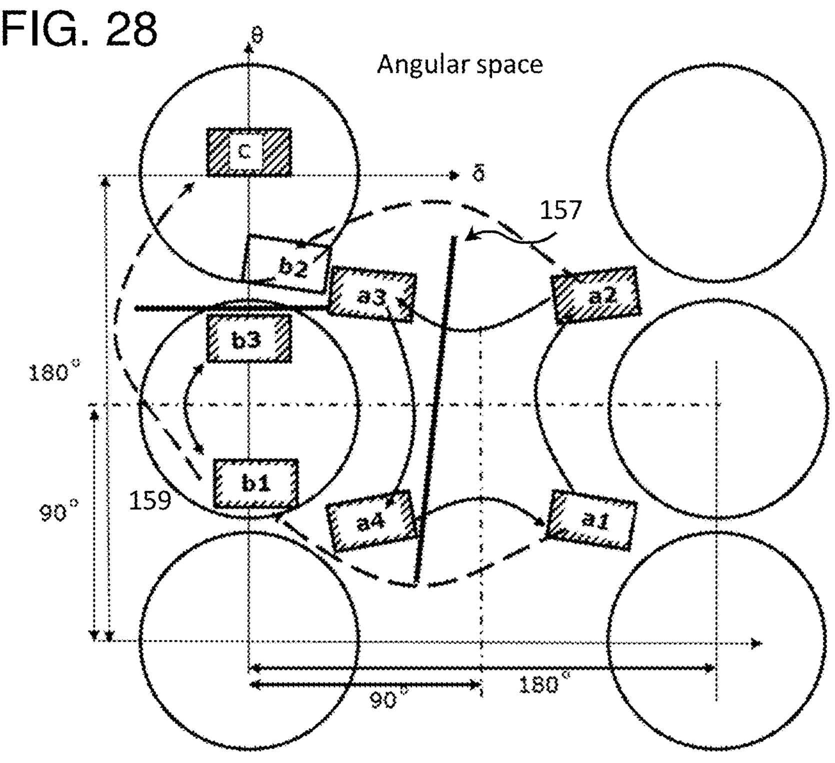
FIGS. 28 and 29A are representations similar to FIG. 3 illustrating the geometrical angular relationships for two exemplary implementations of a device employing the 2D waveguide of FIG. 27 with first and second internal facet orientations, respectively.

FIG. 27 illustrates a further variant implementation of the present invention in which the partially reflecting surfaces of first waveguide 10, here designated 155, are at an oblique angle to both faces 12*a* and 14*a*. (The dashed lines are intended to facilitate visualizing the inclination of the facets, by showing a plane perpendicular to both external faces, and another inclined relative to only one face.) A description of this implementation in angular space is shown in FIG. 28. The initial image in waveguide 10 is presented as a1-a4 having a "landscape" (wide) aspect ratio. The images are injected into the waveguide as image a1 at a twisted angle in order to obtain a final horizontal image. The plane of the 2D tilted internal facet 155 is presented as 157. This facet couples a1 into b1 that is out-coupled from waveguide 10 into waveguide 20. On the other hand, a2 is coupled to b2 that is not in the critical angle margin 159 and is therefore not coupled to waveguide 20, instead being lost. The image b1 generates its own conjugate image b3 within waveguide 20 and eventually is coupled out to the eye as image c (as described above). In this configuration, the requirement for precision of alignment between waveguides 10 and 20 is relaxed.

Figure 29A:
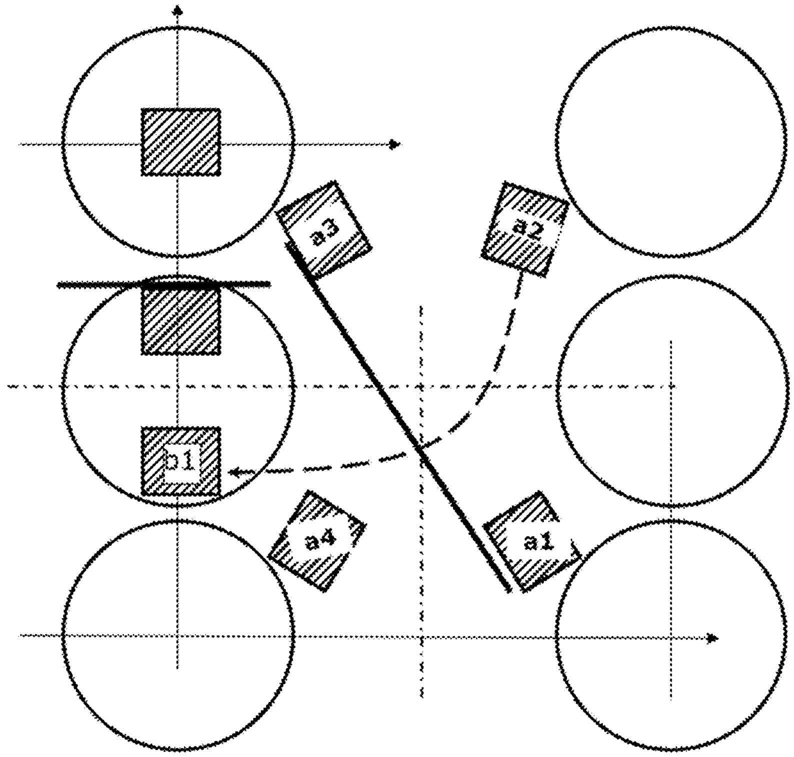
Figure 29B:
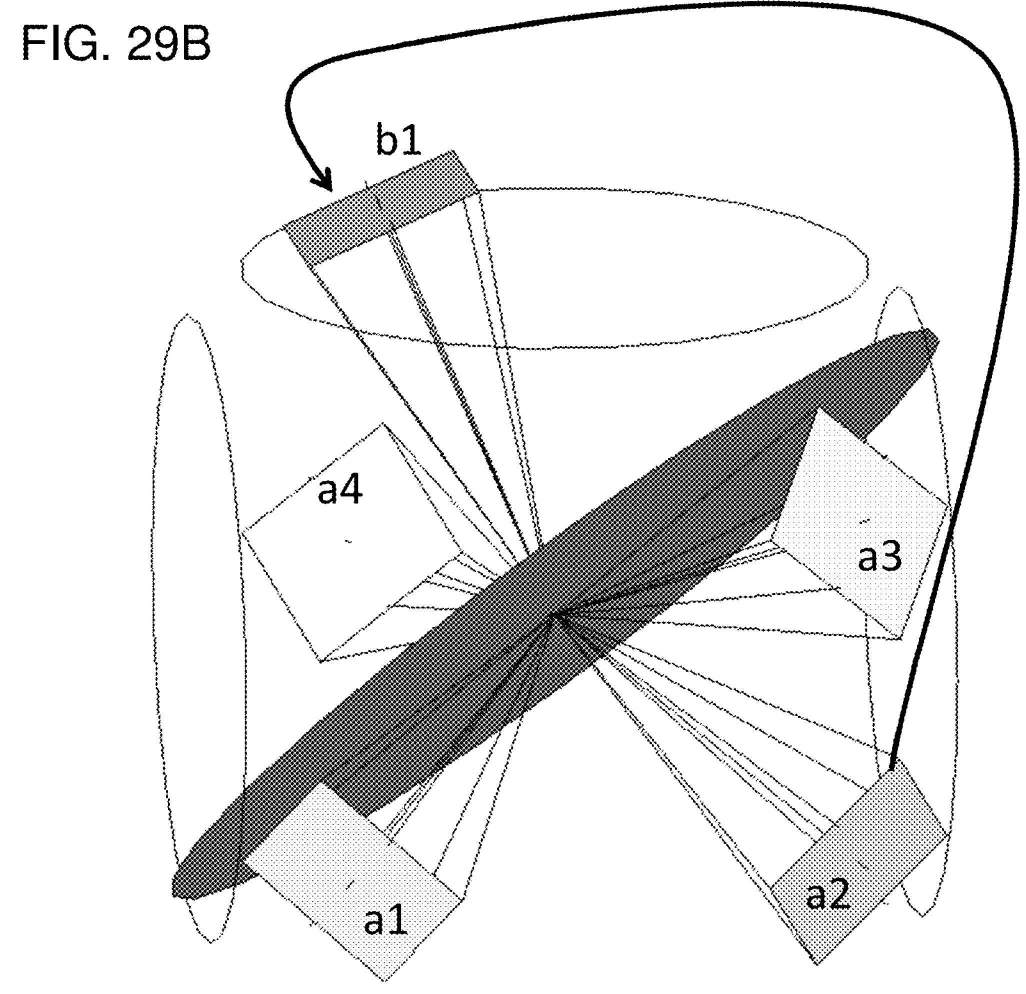
FIG. 29B is a schematic isometric representation of angles of image propagation within the 2D waveguide according to the implementation of FIG. 29A.

According to a further variant of FIG. 27 implementation represented in angular space in FIGS. 29A and 29B, an orientation of facets 40 can be chosen with 2D tilt represented as 110, and with suitable coatings, so as to selectively reflect a significant proportion of only one of the four images propagating within first waveguide 10. Thus, in the geometry illustrated in FIG. 29A, image a2 is selectively coupled into b1, which is coupled out for propagation and expansion in waveguide 20. The remaining images a1, a3 and a4 are at sufficiently small angles that, by suitable selection of coatings, it is possible to substantially eliminate reflections of these images in facets 40. Angular differentiation of the images (a1, a3 and a4 being closer to the facet plane than a2) is best seen in the 3D representation of FIG. 29B. Thus, in one particularly preferred example, facets 40 are coated so as to render them substantially transparent (i.e., generating reflection of less than 5% of incident radiation in the relevant range of wavelengths) for rays incident at between 55° and 85° to the normal to the surface, and to be partially reflecting (typically reflecting at least 10% of incident radiation intensity, and significantly more, typically with at least twice the intensity of reflection, than the "substantially transparent" angular range) for rays incident at inclinations of less than 45° to the normal. The injection angle of the spread of angular directions of the images and the facet inclination angle can then be chosen such that the entire spread of angles for three images (here a1, a3 and a4) fall within the substantially transparent range of angles, while all image angles for one image (here a2) fall within the partially reflecting range. This results in selective coupling-out of only one image, thereby simplifying various aspects of system design. It will be noted that the coupled-out image need not be the same image as was originally generated, and may instead be an inverted conjugate thereof. Where necessary, the original image generating element may generate an inverted conjugate image for injection so that a right image is out-coupled from the waveguides.

Uniformity Enhancement

Non-uniformity in the final enlarged aperture illumination can sometimes result from non-uniform light of the original projected image aperture, or from non-optimal trimming of this aperture. According to a further aspect of the present invention, any such non-uniformity can be smoothed-out by implementing a multi-path configuration of the waveguide.

Figure 30:
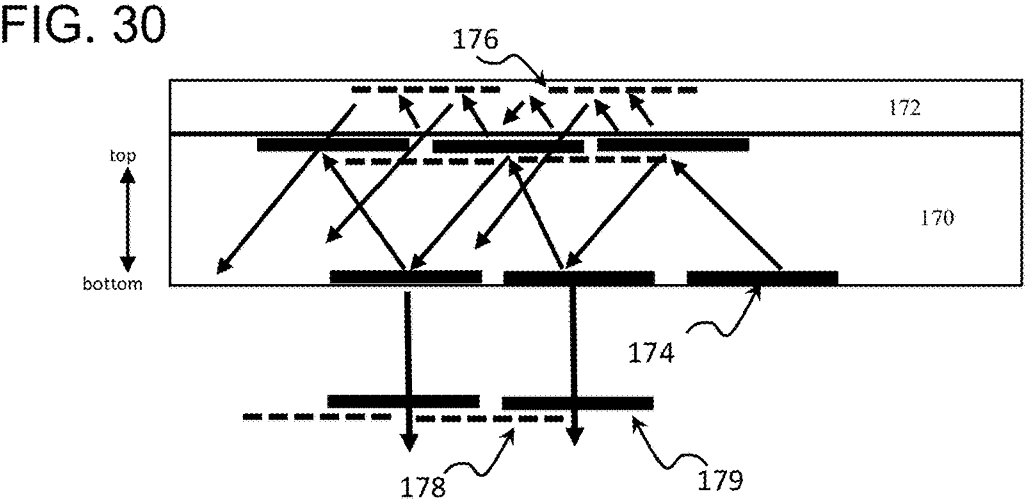
FIG. 30 is a schematic front view of a waveguide according to a further aspect of the present invention juxtaposed with an adjacent waveguide to provide uniformity enhancement.

Referring specifically to FIG. 30, this shows a waveguide 170 (which may be a side view of waveguide 10 or 20) to which is juxtaposed an adjacent parallel waveguide 172. The intermediate interface between these waveguides generates coupling of light, so that part of the light is transmitted between the waveguides and the rest is reflected internally. The intermediate face (between waveguides 170 and 172) and the external faces (top and bottom as shown) are parallel. The partial reflection at the intermediate interface can be based on a coating or a refractive index discontinuity between the waveguides. The reflected aperture 174 propagating within waveguide 170 is coupled into waveguide 172 as 176 (marked as dash line). This image of the aperture is also coupled back into waveguide 170 and out to output aperture 178 along with the "original" aperture 179 by the internal facets 40 or 45 (not shown in this figure). Output apertures 178 and 179 are parallel, but are offset in position, resulting in averaging of any the non-uniformity across the aperture.

Figure 31A:
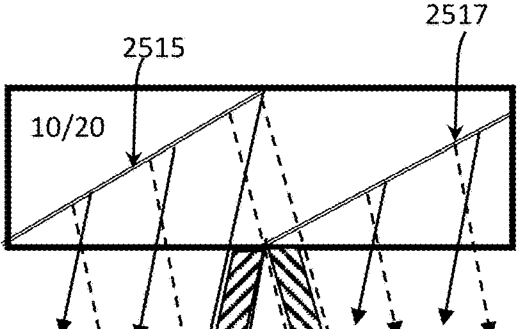
FIGS. 31A and 31B are schematic views of a waveguide illustrating the effects of variation in internal facet spacing on image uniformity according to a further aspect of the present invention.

Another source of perceived non-uniformity relates to angular overlap of internal facets in different fields of view as illustrated in FIG. 31A. In the region of waveguide (10 or 20) illustrated here, the waveguide contains internal facets (two are depicted as 2515 and 2517, that are equivalent to 40 or 45). Most of the out-coupled light is reflected from a single internal facet. However, at the edge of the facets, there is non-uniformity at off-axis angles. For a region of the FOV pointing to the left (marked as solid arrows), an area marked as 2520 will not reflect any light, since at this angle there is an effective gap between the light reflected by facet 2515 and facet 2517, resulting in a dark strip in the perceived. On the other hand, light out-coupled to the right (marked as dashed arrows) has an area 2525 within which there is overlap of the light reflected from 2515 and 2517 so that it will reflect almost twice the amount of light. Therefore, the non-uniformity in FIG. 31A will vary between roughly 200% and 0% of the median image intensity across the extended aperture in different regions of the FOV and eye positions.

Figure 31B:
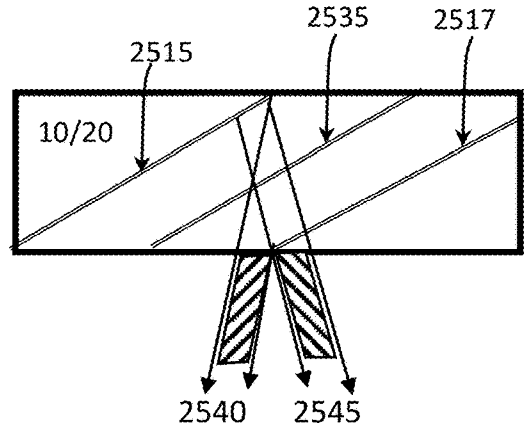

According to a further aspect of the present invention, significant overlap is introduced between the facets, as illustrated in FIG. 31B. In this case, the spacing between adjacent facets is halved, resulting in most parts of the FOV at most eye positions receiving illumination from the image via overlaid reflections from two facets. Near the angular extremities of the image and the extremities of the facets, there will still be changes in the number of overlapping facets which contribute to certain regions of the image, as illustrated by beam 2540 which originates from only one facet and beam 2545 which is contributed to by three adjacent facets. Nevertheless, the non-uniformity is greatly reduced, typically corresponding to roughly ±50%. Additionally, the variation happened at more closely spaced locations across the aperture, thereby tending to be averaged out in the observer's pupil and reducing noticeability of the variations.

Figure 31C:
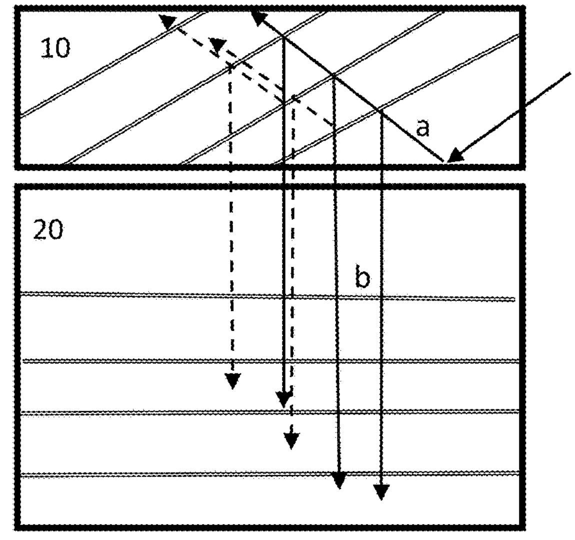
FIG. 31C is a front view of a system similar to that of FIG. 1B illustrating a multi-path implementation for enhancing image uniformity.

A further improvement to reducing non-uniformity may result from the introduction of "multipath" images that are generated by the overlapping internal facets, as depicted in FIG. 31C. 10 The light propagating within waveguide 10 (marked as solid arrows and designated 'a') is coupled out (designated 'b'), but some of the light from b is back-coupled to 'a' (marked as dashed arrows) before being coupled out as 'b'. This back-and-forth coupling between 'a' and 'b' causes averaging of the intensity across the aperture while maintaining light parallelism, thereby further improving light uniformity.

Figures 32A, 32B:
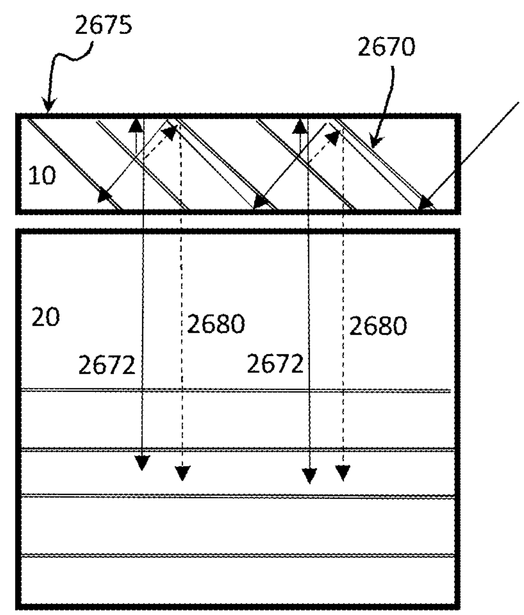
FIGS. 32A and 32B are two further variant multi-path implementations of a system similar to that of FIG. 1B.

Another method of cross-coupling according to certain implementations of the present invention is illustrated in FIGS. 32A and 32B. In FIG. 32A, the internal facets 2670 (equivalent to 40) are at a "reverse" orientation so as to reflect part of the image illumination propagating through TIR from right to left (depicted as solid arrows) at the internal facets upward onto the upper external face 2675. This face is coated so as to render it a total reflector, thereby reflecting light downwards (rays 2672) into waveguide 20.

Some of the light reflected from upper external face 2675 is reflected again by the internal facets (depicted as dashed arrows) and propagates backward along waveguide 10 until being reflected by another internal facet downward as rays 2680. It is apparent that light beams 2672 and 2680 are parallel and offset from each other, thus achieving cross-coupling and smoothing of non-uniformities in the image intensity.

In FIG. 32B, the internal facets are depicted to couple the light downward (up coupling is also included in this embodiment), the bottom external face 2705 is implemented as a partial reflector and the top external face 2710 is implemented as a full (e.g., metalized) reflector. As a result of this configuration, part of the light that is reflected downwards by internal facets 40 and would normally be coupled-out will instead be back-reflected into first waveguide 10. The upward rays (shown as dashed lines) then split into multiple paths, with part passing through the internal facets and reflecting from the upper face 2710, as well as part being reflected back in reverse along an incoming ray path to be reflected upwards at a subsequent internal facet. Rays reflected from the upper face 2710 similarly may pass straight through the internal facets for coupling out, or may undergo further pairs of reflections on internal facets to be coupled-out at a different location. This multi-path mixing and cross-coupling between images further serves to reduce non-uniformity.

It will be noted that the aforementioned multiple internal reflections that occur at high angle to the coupling-out face will also impinge on the front and rear faces of waveguide 10. Depending upon the angles of the beams, it may be preferably to additionally coat the front and rear surfaces of waveguide 10 with a reflective coating.

Figure 33A:
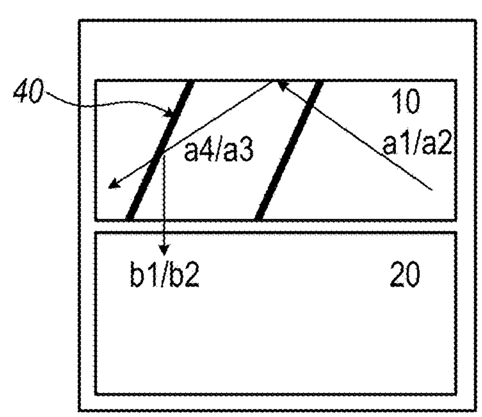
FIG. 33A is a schematic front view of a further alternative implementation of a device similar to FIG. 1B employing internal facets coated so as to selectively reflect shallow angle of incidence rays.
Figure 33B:
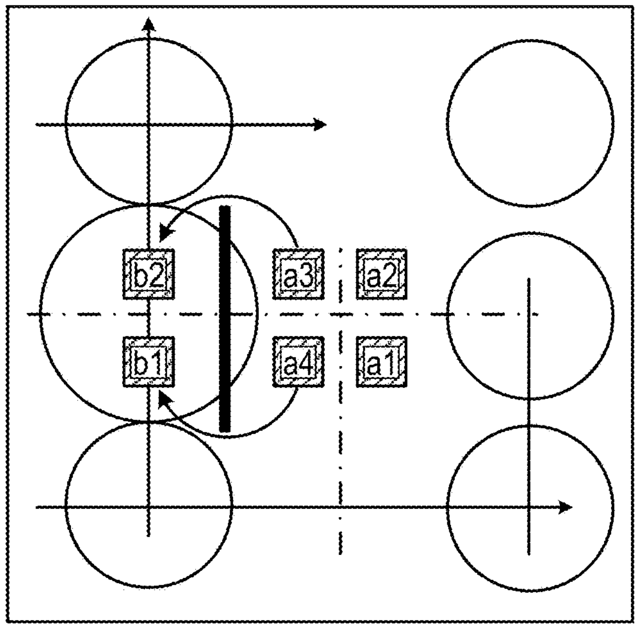
FIG. 33B is a representation similar to FIG. 3 illustrating angular relationships between the various reflected images and internal facets of the optical aperture multiplier of FIG. 33A.
Figure 33C:
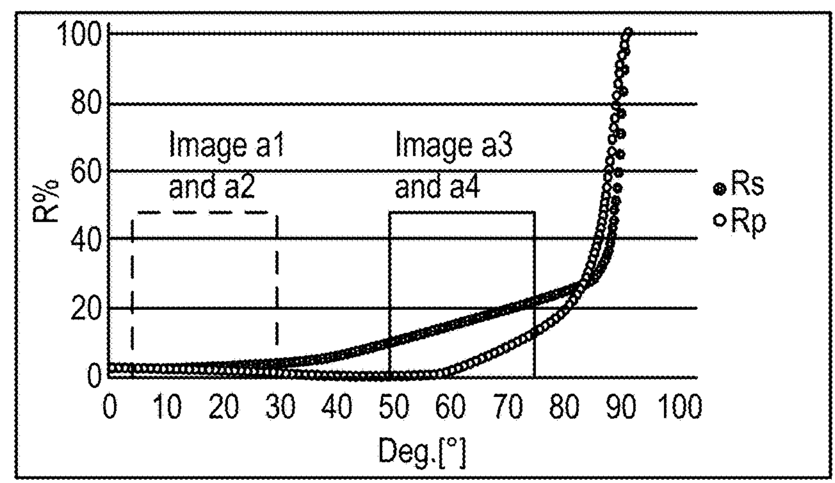
FIG. 33C is a graph illustrating the angular dependence of reflectivity for S and P polarized radiation for coated facets used in the device of FIG. 33A.

Turning now to FIGS. 33A-33C, it will be noted that in the schemes described above with reference to FIGS. 3, 24, 28 and 29, selective partial reflection at the internal facets is designed to occur for the incident images a1 and a2 that are at relatively high inclination to the facet, while the low inclination angle images a3 and a4 are transmitted. As mentioned above, facet coatings suitable for achieving these selective properties are known in the art, and may be found described in the assignee's prior U.S. Pat. Nos. 7,391,573 and 7,457,040.

As an alternative to this approach, FIGS. 33A-33C illustrate an implementation in which the low-inclination image is the image which is coupled out, while the high inclination image is transmitted through the facet. Thus, in the angular plot of FIG. 33B, it is the images a3 and a4 which are coupled out to provide b1 and b2, while images a1 and a2 pass through the internal facet 40 with minimal reflection. This ray geometry is illustrated in FIG. 33A, and is geometrically equivalent to the coupling out of ray c2 in FIG. 2A.

FIG. 33C illustrates an example of the angular reflectivity of the internal facets which may be used to achieve this selectivity. In this graph, the angle relative a normal to the facet is displayed along x-axis, while the reflectivity of each polarization is displayed on the y-axis. The solid square represents the angular range of a3 or a4. It is apparent that S-polarization will be partially reflected while P- polarization is mostly transmitted (as described in previous embodiments). The dashed square represents the conjugate images a1 or a2. The reflectance in both polarizations is minimal therefore they will not be reflected out of waveguide 10.

The coatings required for achieving these reflectivity profiles can be implemented using coatings disclosed in the context of 1D waveguides, such as in the aforementioned U.S. Pat. Nos. 7,391,573 and 7,457,040.

Polarization Scheme

The reflection properties of the facet coatings are polarization dependent. This strong dependency can generate non uniform intensity output of the image projected to the observer if the polarization does not remain constant. Therefore, conventional practice when working with 1D waveguides is to illuminate them using a single polarization (preferably S) with an orientation orthogonal to the waveguide surfaces. This polarization orientation then remains unchanged as the light propagates along the 1D waveguide.

In the context of the 2D waveguide 10 according to the teachings of an aspect of the present invention, the use of a single polarization for an input image does not provide an optimal solution, since the light impinges on the faces at various angles, causing modification of the polarization orientation through these reflections. Consequently, if a single polarization is injected onto the waveguide, its orientation will change along the waveguide and image uniformity will be compromised.

Instead, according to certain particularly preferred implementations of the present invention, the images introduced into first waveguide 10 are coupled in as unpolarized light (or pseudo-unpolarized light, as described below) into the 2D waveguide. By using an unpolarized input, rotation of the polarization does not have any impact on image uniformity. Furthermore, although the out-coupling reflections from the internal facets 40 generates a largely polarized output, the partially polarized transmitted images have their polarization continually scrambled through subsequent reflection at the waveguide faces, thereby contributing to uniformity of the image coupled-out at subsequent internal facets.

The optical image can be generated by a scanning laser, LCD, LCOS, DLP, OLED or other device that emits light. If the projected light is polarized, or if polarization is introduced by a polarized beam splitter, then the light is preferably transmitted through a depolarizer before entering the aperture of first waveguide 10. The depolarizer can be a passive depolarizer (such as a "Lyot" depolarizer, a "Cornu" depolarizer, or a "Wedge" depolarizer) based on varying the polarization of the different spectral components of light. For example, the spectral width of a red, green or blue LED can be in the order of 50 nanometers, and a 1 mm thick Crystal Quartz can achieve good depolarization. Such a depolarizer can be introduced at any optical interface along the image propagation path which is after the last polarizing element in the image projection arrangement. For example, it could be introduced immediately below polarized beam splitter 513 of FIG. 16, or at an intermediate interface between any elements that are joined during manufacture of the waveguide.

Alternatively, a single cell LCD can be used for rapid switching of polarization to achieve pseudo-depolarization as perceived by the time-averaging effects of human visual perception. If the LCD changes the injected light polarization between two orthogonal states within the time of a single frame of a projected image, then the light can be considered as unpolarized for this application. More states may in some cases be preferred (for example, generated by actuating an LCD cell with a reduced voltage to generate an intermediate state), but two orthogonal states will typically produce satisfactory results. For example, if the projected image frame rate is 100 FPS than the LCD should change polarization at rate of 200 Hz and will dwell in each polarization for few milliseconds.

After the unpolarized light is injected into waveguide 10, it encounters the first internal facet 40. Part of the light is reflected by this facet. Since the reflection is partly polarized, the rest of the light that continues to propagate is also partially polarized. Thus, for example, if it is the S polarization that is partially reflected for coupling out to the second waveguide 20, the transmitted light is partially P polarized.

This transmitted light continues to undergo TIR or reflection before impinging on the subsequent internal facets 40. This TIR randomly rotates the polarization of the light and to some degree also depolarizes it. This polarization scrambling (rotation and depolarization) is beneficial, contributing to uniformity of the output coupling along waveguide 10. The polarization scrambling is enhanced (as expressed by Fresnel's equations) by employing a high refractive index difference between waveguide 10 and its environment, for example, where the medium above the top external facet of waveguide 10 is air.

According to one preferred option, a birefringent material or coating is introduced within waveguide 10 in order to enhance polarization scrambling. According to another preferred option, a coating is introduced outside external faces of waveguide 10 in order to enhance polarization scrambling. The above process of partial polarization at the internal facet followed by polarization scrambling repeats itself at each successive internal facet.

Regarding the light reflected at internal facets 40 for coupling out of waveguide 10 and into waveguide 20, this light is typically partly polarized, typically with S polarization, but may undergo further polarization modification at any further reflections occurring at lateral faces of waveguide 10 prior to exiting the first waveguide, and on exiting waveguide 10 into the gap between the waveguides. The resulting polarization properties of the coupled-out light and the orientation of any polarization relative to the second waveguide are thus dependent upon various features of the specific coupling geometry employed. A number of options may be adopted regarding management of the polarization in second waveguide 20.

Optionally, the accumulated deviation from s polarization can be reduced by placing a wave plate at the gap between the waveguides 10 and 20. The actual parameters of the waveplate (or waveplates) are to be determined according the specific output coupled light polarization from waveguide 10 relative to required polarization in waveguide 20. Optionally, a polarizer may be deployed between waveguides 10 and 20 in order to reduce undesired polarization, scattering and ghost images.

Where the extensional directions of facets 45 is orthogonal to facets 40, S-polarization reflected by facets 40 is oriented as P-polarization for facets 45. If S-polarization is optimal for facets 45, then $\lambda/2$ wave plate may be deployed between the waveguides to match the polarization to what is desired for facets 45. This $\lambda/2$ can be placed before or after the previously described polarizer.

In an alternative implementation, the system has been found in some cases to provide acceptable results without implementing polarization management between waveguides 10 and 20. In this case, the polarization of the reflected light from the facets (b1 and b2) will rotate as it propagates down waveguide 20, generating polarization averaging across the facets 45 of waveguide 20. Further optimization of this configuration is achieved by having coatings that reflect both polarizations, such as shown in FIG. 33C in the 50°-75° range. (In this example, reflection of the two polarizations is not equal, but both are significantly reflected.)

It is also possible to introduce a depolarizer in the gap between the two waveguides (in addition to the depolarizer at image injection into the first waveguide). Additionally, or alternatively, birefringent materials (e.g., certain plastics) may be used for the waveguides, further enhancing the polarization scrambling properties of the system.

Manufacturing Processes

Techniques suitable for manufacture of second waveguide 20 are generally known, and may be found, for example, in the assignee's prior U.S. Pat. No. 6,829,095, as described there with reference to FIGS. 32-36.

Figures 34A, 34B, 34C, 34D, 34E:
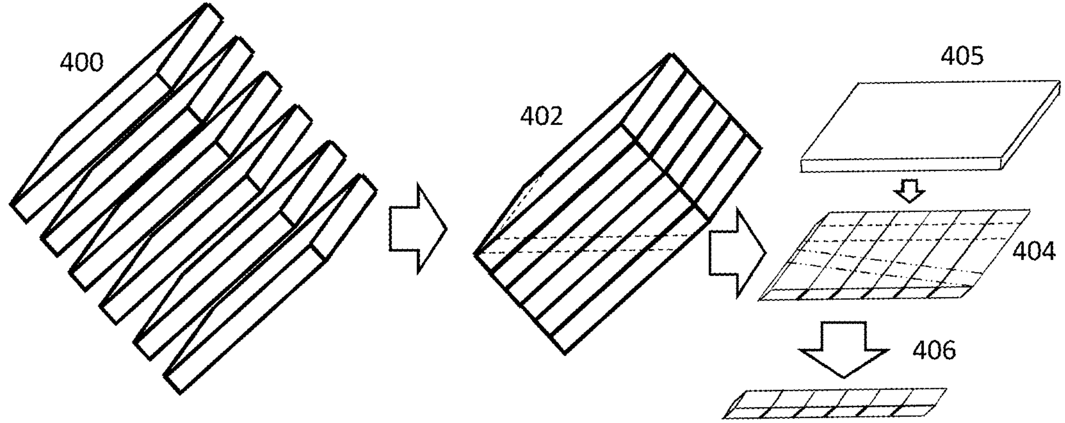
FIGS. 34A-34E are schematic isometric views illustrating a sequence of steps in production of a 2D waveguide and coupling prism according to an aspect of the present invention.

FIG. 34A illustrates a non-limiting but preferred process which may be used to produce first waveguide 10. For clarity, in the drawings, the internal facets are depicted not in scale or density.

A set of coated transparent parallel plates are attached together as stack 400. The stack is cut diagonally (402) in order to generate a slice 404. If required, a cover transparent plate 405 can be attached on top and/or bottom (not depicted) of slice 404. The slice is than cut perpendicular to the edges of the facets (dashed line) if a 1D facet inclination is needed, or diagonally (dot-dashed line) if a 2D facet inclination is needed, to generate the 2D waveguide 406.

For many of the above-described embodiments, a coupling prism is then attached to waveguide 10. An exemplary procedure for attachment of a coupling prism is illustrated in FIGS. 34B-34E. The sliced 2D waveguide 406 is shown in FIG. 34B with overlapping facets (two facets reflecting per line of sight). This is a non-limiting example only, and non-overlapping facets are also possible.

As illustrated in FIG. 34B, the 2D waveguide 406 (depicted not transparent for clarity) is cut, for example, along the dotted line as illustrated. This cut can be at any orientation, but a perpendicular cut alleviates tight index matching requirements. Preferably, as seen in FIG. 34C, the cut is performed where the overlapping facets exist (see cut end in FIG. 34C) in order to maintain uniformity of illumination. Otherwise, the first facet will reflect without overlapping resulting with reduced illumination. A transparent extension 413 can be added if required and prism 414 (equivalent to 91 above, depicted transparent) is attached to 406, generating a 2D waveguide 416 with an extension and coupling prism. In cases where the extension is not needed, the coupling prism 414 may be directly attached to the waveguide to generate the assembled waveguide 417. The distal end of the waveguide may be left, to allow any remnant light to be scattered therefrom, and may optionally be painted with light absorbent material (e.g. black paint) to minimize stray reflections.

Turning now to FIGS. 35A-35D, the observer sees the world through the 1D waveguide 20. Therefore, variations in transparency of the internal facets 45 (in FIG. 1) may be observable and inconvenient. However, in order to maintain uniform illumination of from the waveguide (virtual image) the reflectivity of the internal facets must be higher farther from the waveguide illumination point.

Figures 35A, 35B, 35C, 35D:
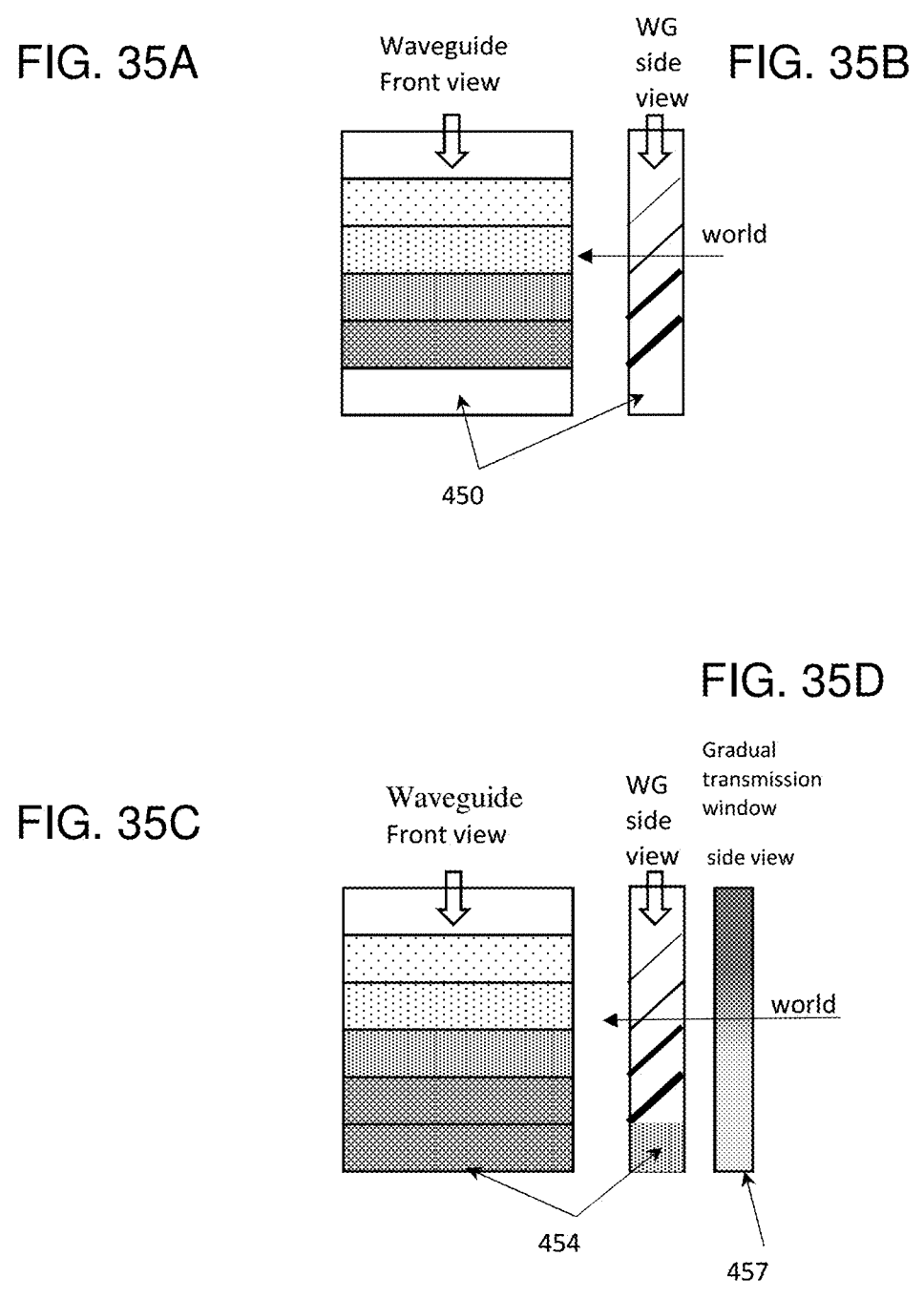

In FIG. 35A-35D, the illumination of the 1D waveguide is depicted as a thick arrow and the higher reflectivity of the facets is depicted as darker transparency in the front views of FIGS. 35A and 35C, and as thicker lines in the side views of FIGS. 35B and 35D.

The section 450 of FIGS. 35A and 35B shows transparent glass at the end of the waveguide. This section doesn't guide light internally and is used only for continuity of the waveguide window to the observer, beyond the region of the projected image. This typically results in an apparent discontinuity between section 450 and the last facet. According to a further aspect of this invention illustrated in FIGS. 35C and 35D, also applicable in a system which is otherwise conventional, the last section 454 is made deliberately to be less transparent, thereby reducing any apparent discontinuity in transmission of the view of the real world between the last facet and section 454. This makes this portion of the image much less disturbing to the observer. The reduced transmission desired for section 454 can also be achieved using a coating on top of section 450.

According to a still further aspect of the invention, an additional graded transparency window 457 can be introduced adjacent (in front or behind) to the waveguide. The graded transparency varies in an opposite direction to the graded transparency that results from the arrangement of successively thicker internal facets, thereby compensating for variations in the appearance of the real worlds viewed through the display and generating an approximately uniform overall combined transparency.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An optical arrangement comprising:

(a) an optical waveguide having first and second mutually parallel planar faces and an end surface; and (b) a coupling prism optically coupled to said end surface for coupling in light corresponding to a collimated image so as to propagate within said optical waveguide by internal reflection at said first and second faces, wherein said coupling prism provides a coupling surface that is parallel to said second face and external to said optical waveguide such that there is a step between said coupling surface and an entrance aperture of said optical waveguide, said light corresponding to a collimated image illuminating said entrance aperture of said optical waveguide both directly and after internal reflection at said coupling surface, and wherein said coupling prism is integrated with a polarizing beam splitter prism having:

(i) an image input surface;

(ii) reflective collimating optics deployed on a second surface of said polarized beam splitter prism, said reflective collimating optics having an optical axis; and (iii) a polarized beam splitter deployed on an obliquely inclined plane so as to direct image illumination from said image input surface towards said reflective collimating optics, wherein said optical axis of said reflective collimating optics is inclined relative to said coupling surface such that the light corresponding to an image injected at said image input surface and reflected by said polarized beam splitter towards said reflective collimating optics passes through said polarized beam splitter and enters said waveguide entrance aperture both directly and after internal reflection at said coupling surface.

2. The optical arrangement of claim 1, wherein an edge defined by an intersection of said first face with said end surface defines an optical cutoff of said entrance aperture of said optical waveguide.

3. The optical arrangement of claim 1, wherein said entrance aperture has an aperture dimension in a direction parallel to said coupling surface, wherein said coupling surface has a width that is greater than said aperture dimension.

4. The optical arrangement of claim 1, wherein said coupling prism provides an input surface oriented such that image rays injected perpendicular to said input surface enter said optical waveguide and undergo internal reflection at said first and second faces.

5. The optical arrangement of claim 1, wherein at least part of said coupling surface lies within a cuboid defined by said image input surface and said second surface.

6. The optical arrangement of claim 1, wherein said optical waveguide further comprises third and fourth mutually parallel planar faces perpendicular to said first and second faces so that said optical waveguide conveys an image via four-fold internal reflection, and wherein said coupling prism provides a second coupling surface that is parallel to said fourth face in a plane external to said optical waveguide such that said light corresponding to a collimated image illuminates said entrance aperture of said optical waveguide after internal reflection at said second coupling surface alone and after internal reflection at both said coupling surface and said second coupling surface.

7. The optical arrangement of claim 6, wherein said coupling surface has a width greater than a distance between said third and fourth planar faces and wherein said second coupling surface has a width greater than a distance between said first and second planar faces.

8. An optical arrangement comprising:

(a) an optical waveguide having at least a first pair of parallel faces for conveying an image via total internal reflection; and (b) an image projecting arrangement optically coupled to said optical waveguide for introducing into said optical waveguide a collimated image, said image projecting arrangement comprising a polarized beam splitter prism having:

(i) an image input surface;

(ii) reflective collimating optics deployed on a second surface of said polarized beam splitter prism, said reflective collimating optics having an optical axis; and (iii) a polarized beam splitter deployed on an obliquely inclined plane so as to direct image illumination from said image input surface towards said reflective collimating optics, said polarized beam splitter prism being optically coupled to said optical waveguide with said optical axis tilted relative to said first pair of parallel faces, said polarized beam splitter prism further comprising a coupling surface lying on a side of said polarized beam splitter away from said reflective collimating optics, coplanar with, or parallel to, a first of said first pair of parallel faces, wherein said collimated image is injected into said optical waveguide at an entrance aperture, said entrance aperture having an aperture dimension in a direction parallel to said coupling surface, wherein said coupling surface has a width that is greater than said aperture dimension.

9. The optical arrangement of claim 8, wherein at least part of said coupling surface lies within a cuboid defined by said image input surface and said second surface.

10. The optical arrangement of claim 8, wherein said polarized beam splitter prism is optically coupled to said waveguide via a coupling prism, and wherein at least part of said coupling surface is provided by said coupling prism.

11. The optical arrangement of claim 8, further comprising an image projecting source optically coupled to said image input surface so as to project an image into said polarized beam splitter prism, said image projecting source and said reflective collimating optics defining an angular field of view for rays of a collimated image projected from said reflective collimating optics, wherein a second of said first pair of parallel faces terminates at an edge, and wherein said first of said first pair of parallel faces and/or said coupling surface form an extended surface extending sufficiently that said edge is illuminated by rays of said collimated image of all angles within said angular field of view after reflection at said extended surface.

12. The optical arrangement of claim 8, wherein said optical waveguide further comprises a second pair of parallel faces so that said optical waveguide conveys an image via four-fold internal reflection, said image input surface and said second surface being tilted relative to both said first and said second pairs of parallel faces, and wherein said polarized beam splitter prism further comprises a second coupling surface lying on a side of said polarized beam splitter away from said reflective collimating optics, coplanar with, or parallel to, one of said second pair of parallel faces.

13. The optical arrangement of claim 12, wherein at least part of said coupling surface and at least part of said second coupling surface lie within a cuboid defined by said image input surface and said second surface.

14. The optical arrangement of claim 12, wherein said polarized beam splitter prism is optically coupled to said waveguide via a coupling prism, and wherein said coupling prism provides at least part of said coupling surface and at least part of said second coupling surface.

15. The optical arrangement of claim 12, further comprising an image projecting source optically coupled to said image input surface so as to project an image into said polarized beam splitter prism, said image projecting source and said reflective collimating optics defining an angular field of view for rays of a collimated image projected from said reflective collimating optics, wherein a second of said first pair of parallel faces terminates at a first edge and a second of said second pair of parallel faces terminates at a second edge, and wherein said first of said first pair of parallel faces and/or said coupling surface form a first extended surface extending sufficiently that said first edge is illuminated by rays of said collimated image of all angles within said angular field of view after reflection at said first extended surface, and wherein said first of said second pair of parallel faces and/or said second coupling surface form a second extended surface extending sufficiently that said second edge is illuminated by rays of said collimated image of all angles within said angular field of view after reflection at said second extended surface.

16. The optical arrangement of claim 12, wherein said coupling surface has a width greater than a distance between said second pair of parallel faces and wherein said second coupling surface has a width greater than a distance between said first pair of parallel faces.

* * * * *